(12) United States Patent
Yamazaki et al.

(10) Patent No.: US 12,003,678 B2
(45) Date of Patent: Jun. 4, 2024

(54) IMAGE READING DEVICE AND IMAGE FORMING APPARATUS INCORPORATING THE IMAGE READING DEVICE

(71) Applicants: Kimiharu Yamazaki, Kanagawa (JP); Hideyo Makino, Tokyo (JP); Susumu Mikajiri, Tokyo (JP); Tohru Matsumoto, Kanagawa (JP); Satoshi Nakayama, Kanagawa (JP); Kohta Aoyagi, Kanagawa (JP); Ryosuke Ebinuma, Tokyo (JP); Tatsuya Ishii, Kanagawa (JP)

(72) Inventors: Kimiharu Yamazaki, Kanagawa (JP); Hideyo Makino, Tokyo (JP); Susumu Mikajiri, Tokyo (JP); Tohru Matsumoto, Kanagawa (JP); Satoshi Nakayama, Kanagawa (JP); Kohta Aoyagi, Kanagawa (JP); Ryosuke Ebinuma, Tokyo (JP); Tatsuya Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 257 days.

(21) Appl. No.: 17/560,988

(22) Filed: Dec. 23, 2021

(65) Prior Publication Data

US 2022/0219932 A1    Jul. 14, 2022

(30) Foreign Application Priority Data

Jan. 12, 2021 (JP) .................................. 2021-003114
Jul. 19, 2021 (JP) .................................. 2021-118759

(51) Int. Cl.
*H04N 1/00* (2006.01)
*B65H 7/20* (2006.01)
*B65H 5/06* (2006.01)

(52) U.S. Cl.
CPC .......... *H04N 1/00909* (2013.01); *B65H 7/20* (2013.01); *B65H 5/062* (2013.01);
(Continued)

(58) Field of Classification Search
CPC ..... H04N 1/00909; G03G 2215/00531; G03G 2221/0005; G03G 2221/0089
See application file for complete search history.

(56) References Cited

U.S. PATENT DOCUMENTS 5,142,340 A * 8/1992 Farrell ................. G03G 15/234
399/327
2018/0020108 A1* 1/2018 Nakayama ........... H04N 1/1235
(Continued)

FOREIGN PATENT DOCUMENTS

| EP | 0316198 A2 | 5/1989 |
|---|---|---|
| JP | 2016-111654 | 6/2016 |
| WO | WO-92/04990 A1 | 4/1992 |

OTHER PUBLICATIONS

European Search Report dated May 9, 2022 for corresponding European Application No. 21217584.8.

*Primary Examiner* — Jeremy R Severson
(74) *Attorney, Agent, or Firm* — Harness, Dickey & Pierce, P.L.C.

(57) ABSTRACT

An image reading device includes a reader, a transparent member, an opposing member, first and second conveyance rotators, and circuitry. The reader reads a sheet. The transparent member is disposed between the reader and the sheet. The opposing member is disposed facing the reader via the transparent member. The first conveyance rotator is disposed upstream from the reader in a conveyance direction of the sheet. The second conveyance rotator is disposed downstream from the reader in the conveyance direction. The circuitry cause the first conveyance rotator and the second conveyance rotator to convey a cleaning sheet at respective (Continued)

conveying speeds different from each other and bring the cleaning sheet into contact with at least one of the transparent member or the opposing member.

10 Claims, 21 Drawing Sheets

(52) U.S. Cl.
CPC ............ *G03G 2215/00531* (2013.01); *G03G 2215/00945* (2013.01); *G03G 2221/0005* (2013.01); *G03G 2221/0026* (2013.01); *G03G 2221/0089* (2013.01)

(56) References Cited

U.S. PATENT DOCUMENTS

| | | | |
|---|---|---|---|
| 2019/0063901 A1* | 2/2019 | Mitsui | G01B 11/0691 |
| 2021/0016584 A1 | 1/2021 | Aoyagi et al. | |
| 2021/0168253 A1 | 6/2021 | Nakayama et al. | |
| 2021/0297543 A1 | 9/2021 | Nakayama et al. | |

* cited by examiner

US 12,003,678 B2

IMAGE READING DEVICE AND IMAGE FORMING APPARATUS INCORPORATING THE IMAGE READING DEVICE

CROSS-REFERENCE TO RELATED APPLICATIONS

This patent application is based on and claims priority pursuant to 35 U.S.C. § 119(a) to Japanese Patent Application Nos. 2021-003114, filed on Jan. 12, 2021, and 2021-118759, filed on Jul. 19, 2021, in the Japan Patent Office, the entire disclosure of each of which is hereby incorporated by reference herein.

BACKGROUND

Technical Field

Embodiments of the present disclosure relate to an image reading device and an image forming apparatus incorporating the image reading device.

Background Art

Various image forming apparatuses are known to include an image reading device that reads a sheet material on which an image is formed, so as to use the reading result for detecting a defect image (abnormal image) and correcting the position and the color of the image to be formed.

A known image forming apparatus has a configuration in which a cleaning chart is conveyed while contacting a reading plate to remove foreign materials on the reading plate. Such a cleaning chart is known to form a convex cleaning image projected with toner on the cleaning chart.

SUMMARY

Embodiments of the present disclosure described herein provide a novel image reading device including a reader, a transparent member, an opposing member, a first conveyance rotator, a second conveyance rotator, and circuitry. The reader reads a sheet. The transparent member is disposed between the reader and the sheet facing the reader. The opposing member is disposed facing the reader via the transparent member. The first conveyance rotator is disposed upstream from the reader in a conveyance direction of the sheet. The second conveyance rotator is disposed downstream from the reader in the conveyance direction. The circuitry causes the first conveyance rotator and the second conveyance rotator to convey a cleaning sheet at respective conveying speeds different from each other and bring the cleaning sheet into contact with at least one of the transparent member or the opposing member.

Further, embodiments of the present disclosure described herein provide an image forming apparatus including an image forming device configured to form an image on a sheet, and the above-described image reading device to read the image on the sheet.

BRIEF DESCRIPTION OF THE SEVERAL VIEWS OF THE DRAWINGS

Exemplary embodiments of this disclosure will be described in detail based on the following figures, wherein.

Figure 1:
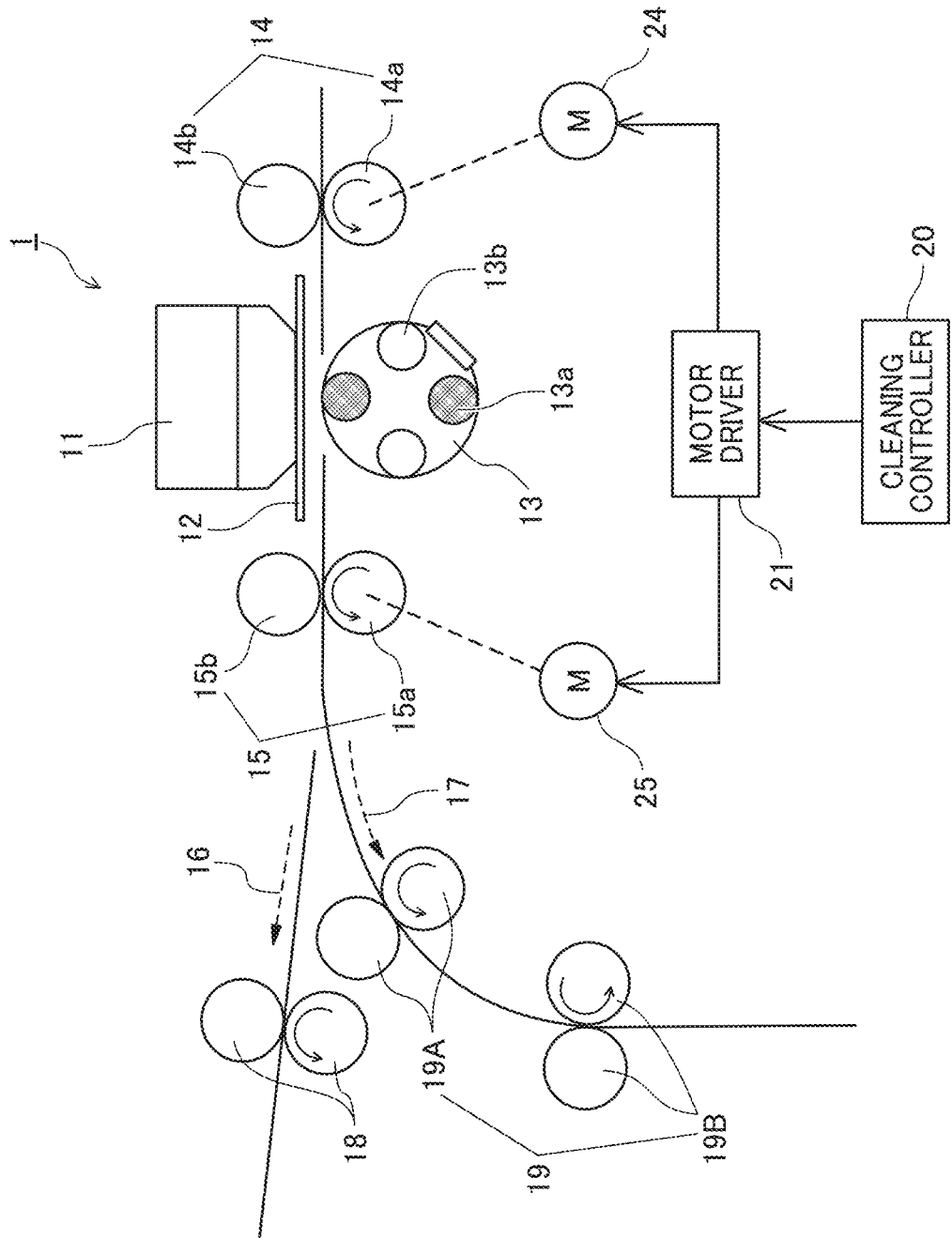
FIG. 1 is a diagram illustrating an image reading device according to a first embodiment of the present disclosure and a conveyance passage through which a reading target object passes.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of an image reading device and an image forming apparatus, according to an embodiment of the present disclosure, with reference to drawings. Note that identical parts or equivalents are given identical reference numerals and redundant descriptions are summarized or omitted accordingly.

Embodiments of the present disclosure are described below with reference to the attached drawings.

A description is given of a first embodiment of the present disclosure, with reference to FIGS. 1 to 4B.

FIG. 1 is a diagram illustrating an image reading device according to a first embodiment of the present disclosure and a conveyance passage through which a reading target passes.

Figure 2:
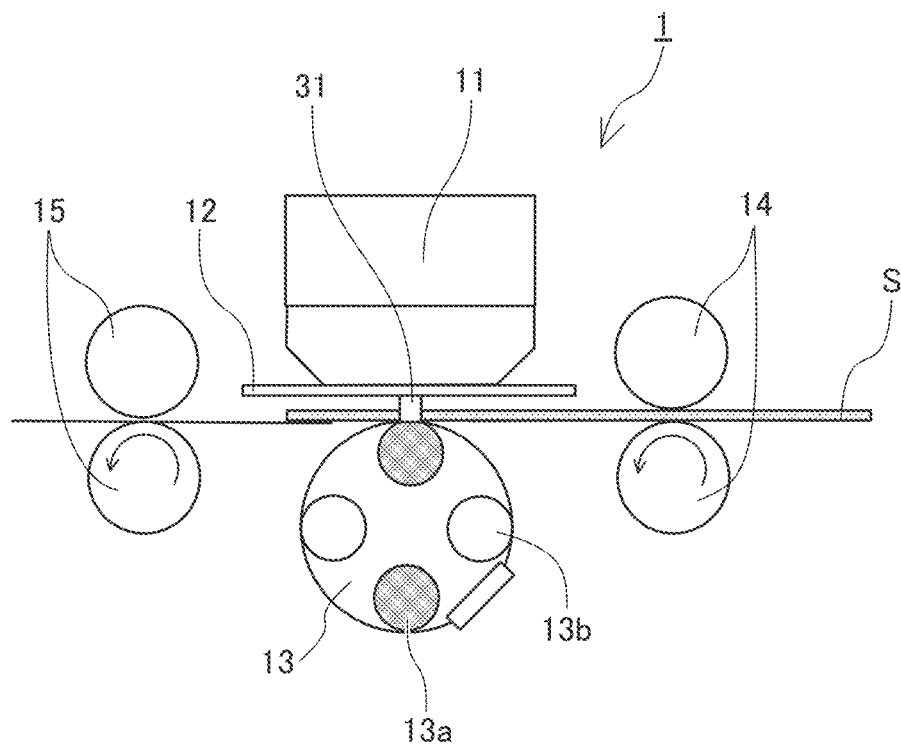
FIG. 2 is a side view of the image reading device of FIG. 1, when conveying a sheet.

FIG. 2 is a side view of the image reading device of FIG. 1, when conveying a sheet.

Figure 3:
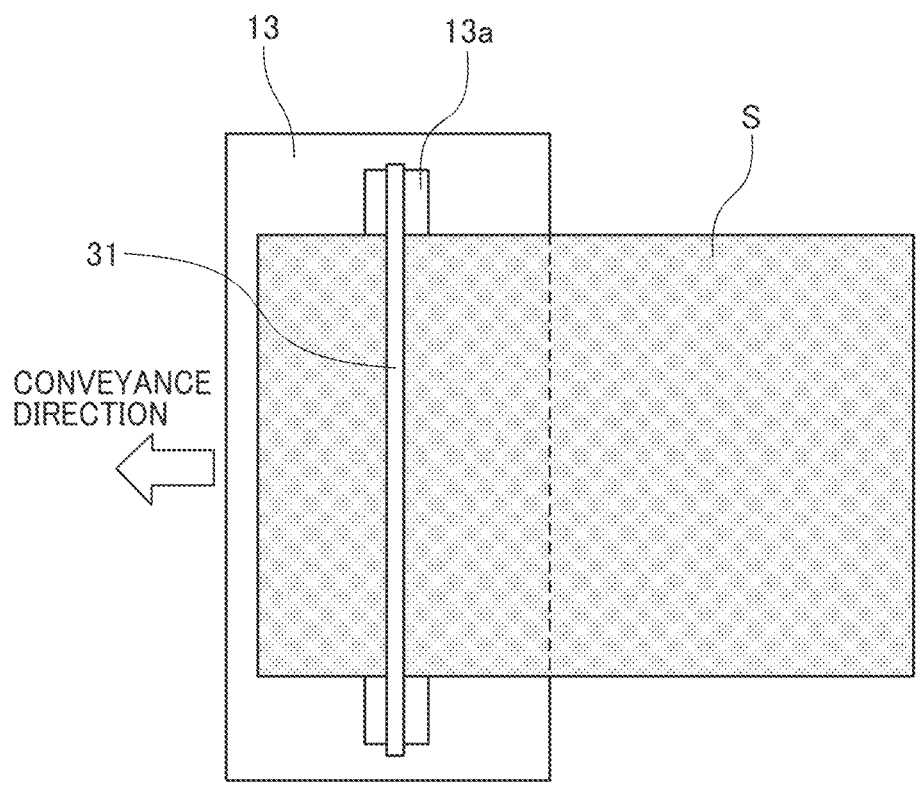
FIG. 3 is a plan view of the image reading device of FIG. 1, when conveying the sheet.

FIG. 3 is a plan view of the image reading device of FIG. 1, when conveying the sheet.

Figure 4A:
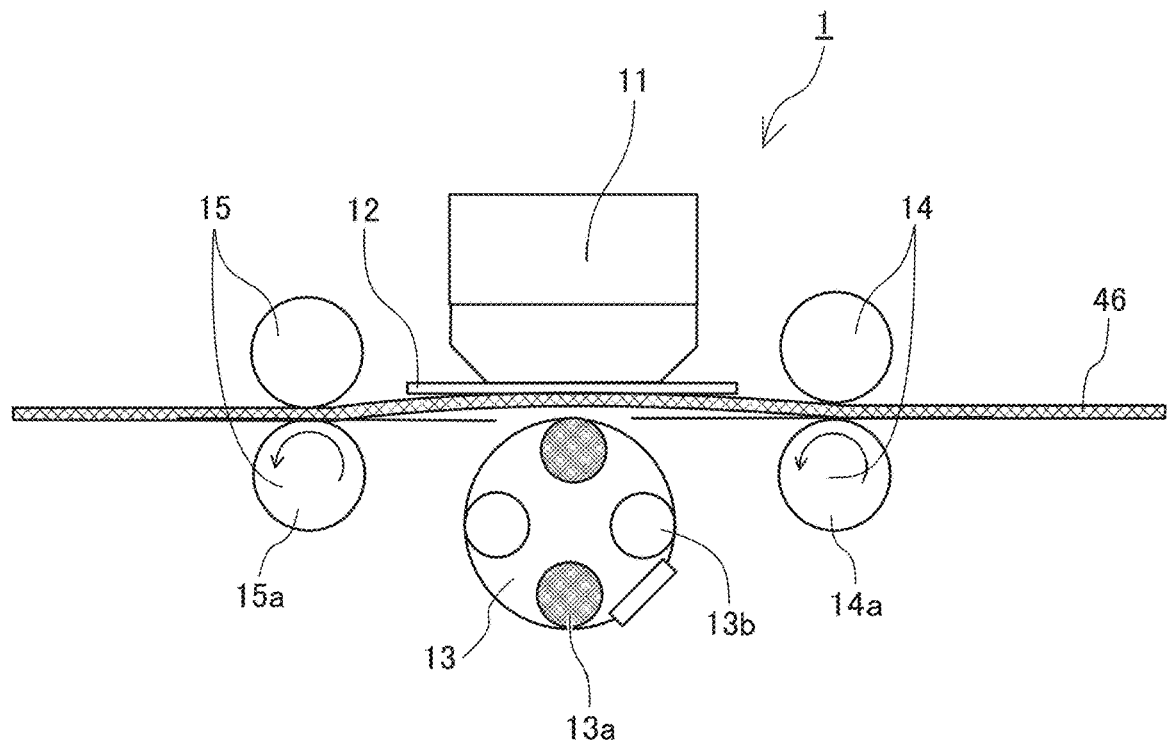
FIGS. 4A and 4B are side views, each illustrating the image reading device of FIG. 1, when conveying a cleaning sheet.
Figure 4B:
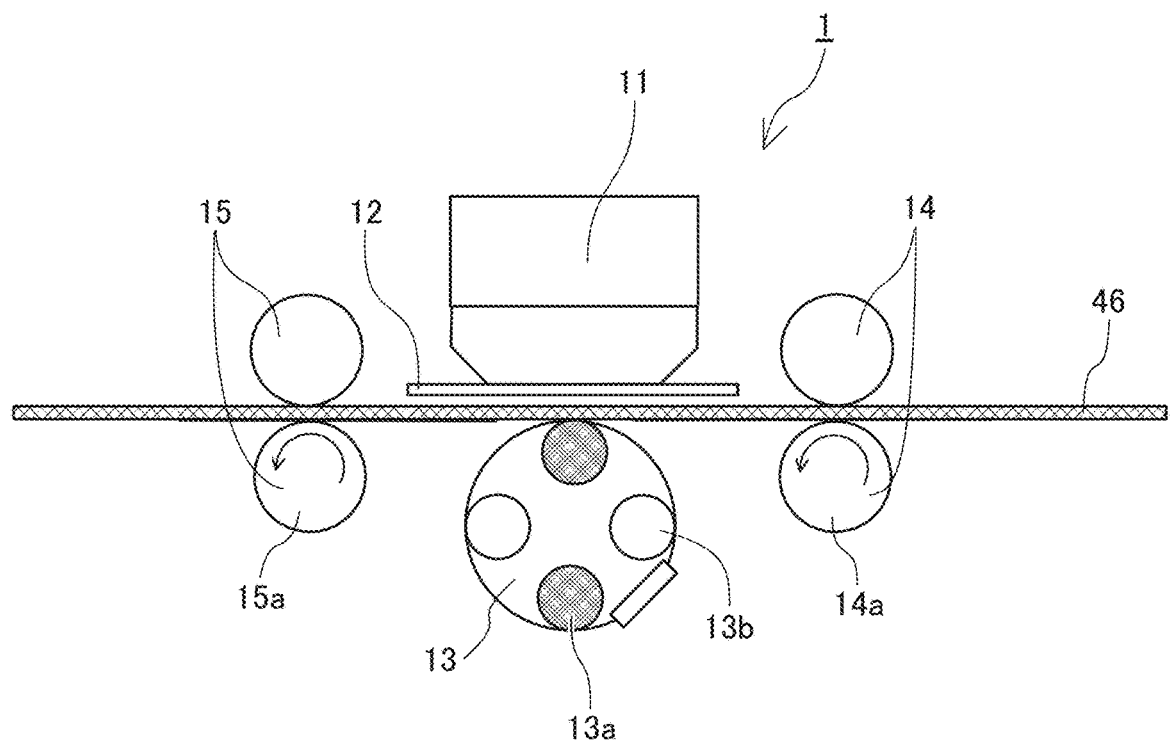

FIGS. 4A and 4B are side views, each illustrating the image reading device of FIG. 1, when conveying a cleaning sheet.

The image reading device 1 includes a reading unit 11, an exposure glass 12, a background switching revolver 13, an upstream conveyance roller pair 14, and a downstream conveyance roller pair 15.

The reading unit 11 reads a sheet S that is conveyed in the image reading device 1. The process of reading the sheet S includes confirmation of the sheet S and reading of an image formed on the sheet S. In the present embodiment, the reading unit 11 uses a contact image sensor that includes a reading unit and an irradiation unit as a single unit. However, the structure of the reading unit 11 is not limited to this structure.

The exposure glass 12 is a transparent member (reading plate) interposed between the reading unit 11 and the sheet S while being conveyed under the exposure glass 12.

The background switching revolver 13 is an opposing member disposed facing the reading unit 11 across the exposure glass 12 (transparent member). The background switching revolver 13 has two black background rollers 13a and two white background rollers 13b around the circumferential surface. Each of the black background rollers 13a has a black peripheral surface. Each of the white background rollers 13b has a white peripheral surface. The background switching revolver 13 is rotated to switch a background color in accordance with white shading or a reading target that is an object to be read.

The upstream conveyance roller pair 14 includes a conveyance roller 14a and a driven roller 14b. The conveyance roller 14a and the driven roller 14b are disposed upstream from the reading unit 11 in a conveyance direction in which the sheet S is conveyed. The conveyance roller 14a functions as a first conveyance rotator. The downstream conveyance roller pair 15 includes a conveyance roller 15a and a driven roller 15b. The conveyance roller 15a and the driven roller 15b are disposed downstream from the reading unit 11 in the conveyance direction of the sheet S. The conveyance roller 15a functions as a second conveyance rotator.

A straight conveyance passage 16 and a reverse conveyance passage 17 extend toward downstream in the conveyance direction of the sheet S in the image reading device 1. A conveyance roller pair 18 is disposed on the straight conveyance passage 16. Conveyance roller pairs 19 including a conveyance roller pair 19A and a conveyance roller pair 19B are disposed on the reverse conveyance passage 17. The conveyance roller pair 19B is disposed downstream from the conveyance roller pair 19A in the conveyance direction of the sheet S.

The sheet S is conveyed through the straight conveyance passage 16 to be ejected with the face up. By contrast, the sheet S is conveyed through the reverse conveyance passage 17 to be ejected with the face down. Alternatively, in duplex printing, the sheet S is conveyed through the reverse conveyance passage 17 after the first face of the sheet S is printed, and is then conveyed through the straight conveyance passage 16 after the second face of the sheet S.

The conveyance roller 14a of the upstream conveyance roller pair 14 is driven and rotated by a drive motor 24. The conveyance roller 15a of the downstream conveyance roller pair 15 is driven and rotated by a drive motor 25. The drive motors 24 and 25 are driven and rotated by a motor driver 21.

A cleaning controller 20 controls each of driving of the first conveyance rotator (i.e., the conveyance roller 14a) and driving of the second conveyance rotator (i.e., the conveyance roller 15a) via the motor driver 21 when cleaning the exposure glass 12 or the background switching revolver 13.

When a sheet-like cleaning member 46 is conveyed to clean the exposure glass 12 or the background switching revolver 13, the cleaning controller 20 causes the conveyance roller 14a and the conveyance roller 15a to rotate at the conveying speeds different from each other. The sheet-like cleaning member 46 is hereinafter referred to as a cleaning sheet 46.

In the present embodiment, by setting the number of rotations of the conveyance roller 14a and the number of rotations of the conveyance roller 15a different from each other, the cleaning controller 20 causes the cleaning sheet 46 to contact the exposure glass 12 (transparent member) or the background switching revolver 13 (opposing member).

Next, a description is given of operations of reading the sheet S by the image reading device 1.

As illustrated in FIGS. 2 and 3, when the sheet S passes below the reading unit 11, the image reading device 1 causes the reading unit 11 to sequentially read the state of the sheet S on a reading line 31, so that the image reading device 1 acquires data of sheet S and data of the image formed on the sheet S.

At this time, the background switching revolver 13 switches the background roller in accordance with the sheet S. When the sheet S is white, either one of the black background rollers 13a is brought over the reading line 31. When the sheet S is black or when show-through of an image is concerned, either one of white background rollers 13b is brought over the reading line 31.

Figure 5:
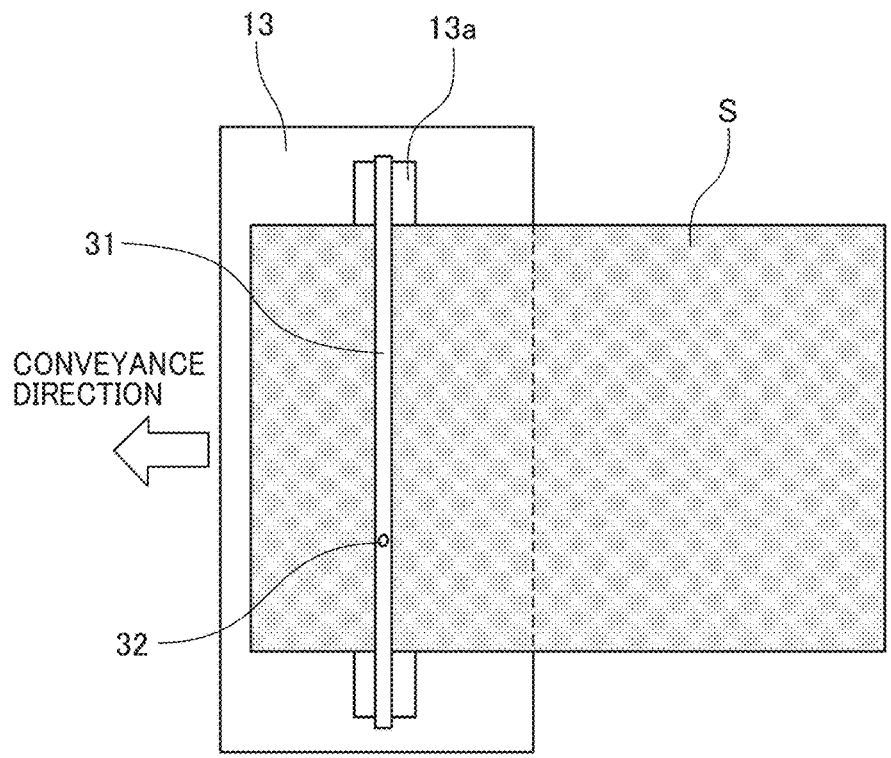
FIG. 5 is a plan view of the image reading device of FIG. 1, for explaining a foreign material on an exposure glass mounted on the image reading device and the reading result.
Figure 6:
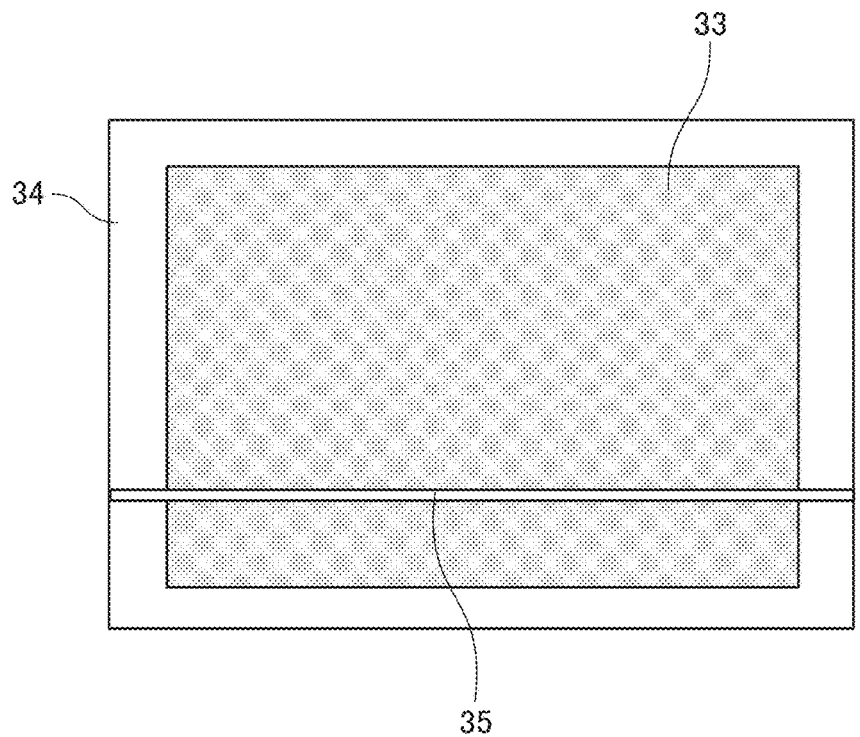
FIG. 6 is a plan view of the image reading device of FIG. 1, for explaining the reading result.

Next, a description is given of the image reading device with an example of a foreign material on the exposure glass and a reading result, with reference to FIGS. 5 and 6.

FIG. 5 is a plan view of the image reading device, for explaining a foreign material on the exposure glass mounted on the image reading device and the reading result.

FIG. 6 is a plan view of the image reading device, for explaining the reading result.

As illustrated in FIG. 5, it is assumed that a foreign material 32 is adhered on the exposure glass 12 on the reading line 31 on which the reading unit 11 reads the sheet S. When the reading unit 11 reads the sheet S with the foreign material 32 adhered on the reading line 31, a read image as illustrated in FIG. 6 is produced.

The read image that is read by the reading unit 11 includes not only a sheet reading image 33 and a read background 34 but also a longitudinal streak 35 generated due to the foreign material 32 along the conveyance direction of the sheet S.

As described above, when the foreign material 32 is adhered on the reading line 31, the foreign material 32 blocks irradiation light from the reading unit 11. For this reason, when the foreign material 32 is adhered in an area on the reading line 31, the reading unit 11 cannot read information of the area of the sheet S. When the area of the sheet S cannot be read, even if a defect image is in the area, the reading unit 11 cannot read, resulting in the functional deterioration. Alternatively, even when there is no defect in the image, it is likely that the reading unit 11 reads the foreign material 32 to determine that the image is defected.

In order to avoid this situation, it is highly desirable that the reading result of a sheet by the reading unit 11 is not to be affected by foreign materials such as debris. However, in a case in which the sheet S is paper, it is difficult to avoid such an adverse effect on the sheet S due to various causes of occurrence of foreign materials such as paper dust or toner in an image forming apparatus.

In order to avoid this situation, in the present embodiment, the sheet-like cleaning member (cleaning sheet) 46 is brought to contact the exposure glass 12 or the background switching revolver 13, so as to clean the exposure glass 12 or the background switching revolver 13. Note that the cleaning sheet 46 may be a special sheet for cleaning or a sheet S for image formation. The cleaning sheet 46 may be, for example, a convex-concave paper or a Japanese paper.

Next, a description is given of a cleaning operation performed when cleaning an exposure glass or a background switching revolver, according to the present embodiment.

As described above, when cleaning the exposure glass 12 or the background switching revolver 13, the cleaning controller 20 causes the number of rotations of the conveyance roller 14a of the upstream conveyance roller pair 14 and the number of rotations of the conveyance roller 15a of the downstream conveyance roller pair 15 to be different from each other. For convenience, the conveyance roller 14a of the upstream conveyance roller pair 14 is referred to as an upstream conveyance roller 14a. Similarly, the conveyance roller 15a of the downstream conveyance roller pair 15 is referred to as a downstream conveyance roller 15a. Note that, in the present embodiment, the upstream conveyance roller 14a and the downstream conveyance roller 15a have the same diameter and the different number of rotations from each other. According to this configuration, the upstream conveyance roller 14a and the downstream conveyance roller 15a have the different surface linear velocities from each other, and therefore also have the different conveying speeds from each other.

As illustrated in FIG. 4A, when the cleaning sheet 46 is conveyed to clean the exposure glass 12 (transparent member), the number of rotations of the downstream conveyance roller 15a is smaller than the number of rotations of the upstream conveyance roller 14a. At this time, the linear velocity of the downstream conveyance roller 15a is slower than the linear velocity of the upstream conveyance roller 14a.

As a result, the cleaning sheet 46 may be bent between the upstream conveyance roller pair 14 and the downstream conveyance roller pair 15 so as to be convex (outward) toward the exposure glass 12. With such a configuration, the cleaning sheet 46 is conveyed while the cleaning sheet 46 is pressed against the exposure glass 12 with an appropriate pressure, so that the surface of the exposure glass 12 is cleaned.

As illustrated in FIG. 4B, when the cleaning sheet 46 is conveyed to clean the background switching revolver 13 (opposing member), the number of rotations of the downstream conveyance roller 15a is greater than the number of rotations of the upstream conveyance roller 14a. At this time, the linear velocity of the downstream conveyance roller 15a is faster than the linear velocity of the upstream conveyance roller 14a.

As a result, as illustrated in FIG. 4B, the cleaning sheet 46 is conveyed while being stretched taut between the upstream conveyance roller pair 14 and the downstream conveyance roller pair 15 so as to be reliably contact the circumferential surface of the background switching revolver 13. With such a configuration, the background switching revolver 13 is rotated to bring the black background roller 13a or the white background roller 13b to the position at which the black background roller 13a or the white background roller 13b contacts the cleaning sheet 46. By so doing, the (circumferential) surface of the black background roller 13a or the (circumferential) surface of the white background roller 13*b* is cleaned. The white shading surface is cleaned similarly.

As described above, the exposure glass 12 or the background face of the background switching revolver 13 is cleaned while the cleaning sheet 46 is in contact with the exposure glass 12 or the background switching revolver 13, thereby enhancing the cleanability in the image reading device 1.

Next, a description is given of the image reading device according to a second embodiment of the present disclosure, with reference to FIGS. 7A to 8B.

Figure 7A:
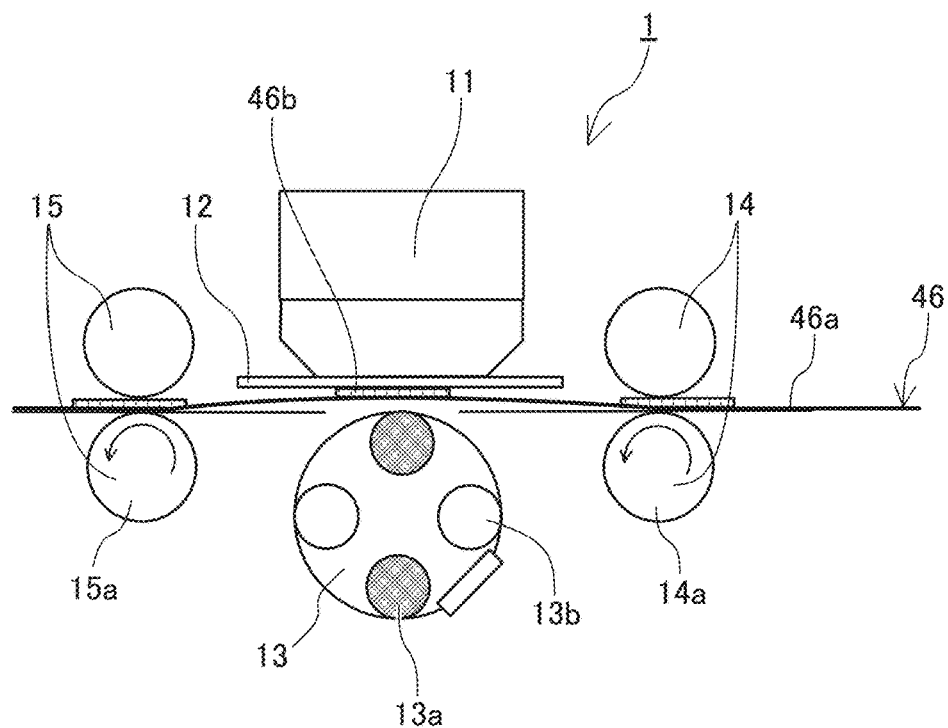
FIGS. 7A and 7B are side views, each illustrating an image reading device according to a second embodiment of the present disclosure, in a cleaning operation performed on the image reading device.
Figure 7B:
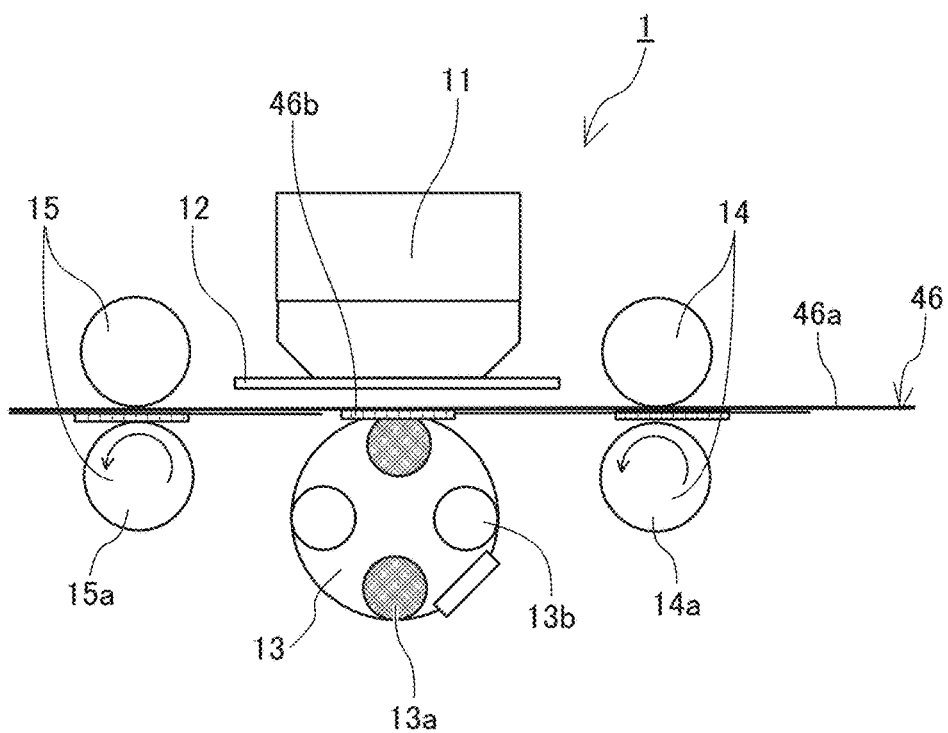

FIGS. 7A and 7B are side views, each illustrating the image reading device according to the second embodiment of the present disclosure, in the cleaning operation performed on the image reading device.

Figure 8A:
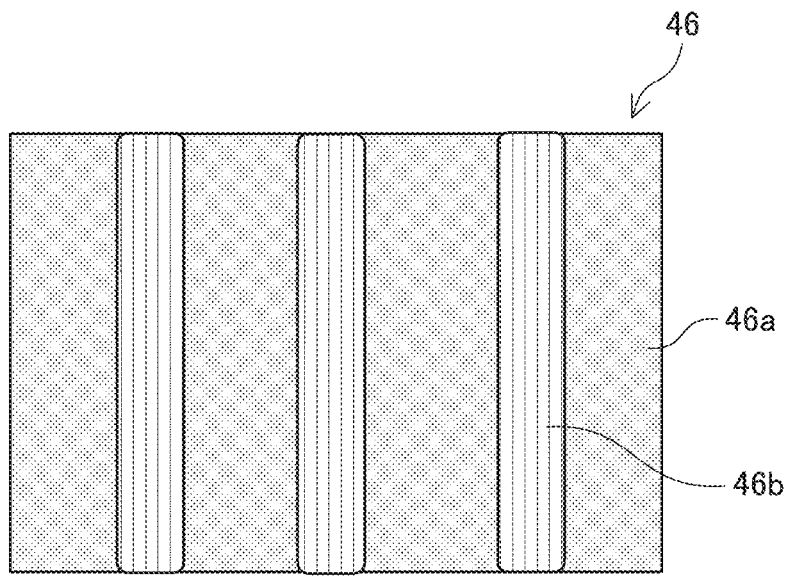
FIGS. 8A and 8B are diagrams, each illustrating a cleaning sheet used in the image reading device of FIGS. 7A and 7B.
Figure 8B:
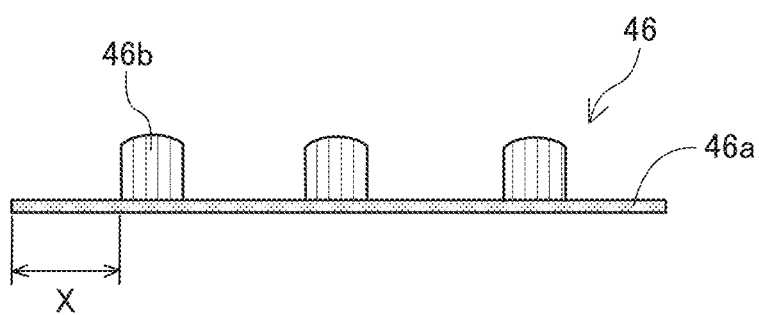

FIGS. 8A and 8B are diagrams, each illustrating the cleaning sheet used in the image reading device of FIGS. 7A and 7B.

As illustrated in FIGS. 8A and 8B, the cleaning sheet 46 used in the present embodiment includes a base 46*a* and brushes 46*b* for cleaning disposed partly on one side of the base 46*a*, along the conveyance direction of the cleaning sheet 46. The brushes 46*b* are aligned in a belt-like shape along a direction that intersects with the conveyance direction of the cleaning sheet 46. The brushes 46*b* in FIGS. 8A and 8B are aligned in a direction orthogonal to the conveyance direction of the cleaning sheet 46. However, the brushes 46*b* may be aligned in an oblique direction to the conveyance direction of the cleaning sheet 46.

Further, in order to prevent instant impact between the brushes 46*b* of the cleaning sheet 46 and each of the exposure glass 12 and the background switching revolver 13, it is preferable to sufficiently obtain a distance X from the leading end of the base 46*a* in the conveyance direction of the cleaning sheet 46, to the first brush 46*b* of the brushes 46*b*.

When cleaning the exposure glass 12 by the cleaning sheet 46, the cleaning sheet 46 is conveyed with the brushes 46*b* facing the exposure glass 12, as illustrated in FIG. 7A. At this time, as in the first embodiment, the number of rotations of the downstream conveyance roller 15*a* is smaller than the number of rotations of the upstream conveyance roller 14*a*.

As a result, the cleaning sheet 46 is bent to be convex (outward) toward the exposure glass 12, so that the brushes 46*b* of the cleaning sheet 46 may be brought to contact the exposure glass 12. With such a configuration, the cleaning sheet 46 is conveyed to wipe and clean the exposure glass 12 by the brushes 46*b*.

When cleaning the background switching revolver 13 with the cleaning sheet 46, the cleaning sheet 46 is conveyed with the brushes 46*b* facing the background switching revolver 13, as illustrated in FIG. 7B. At this time, as in the first embodiment, the number of rotations of the downstream conveyance roller 15*a* is greater than the number of rotations of the upstream conveyance roller 14*a*.

As a result, the cleaning sheet 46 is stretched taut, so that the brushes 46*b* of the cleaning sheet 46 may be brought to contact the black background roller 13*a* or the white background roller 13*b* of the background switching revolver 13. With such a configuration, the cleaning sheet 46 is conveyed to wipe and clean the circumferential surface of the black background roller 13*a* or the circumferential surface of the white background roller 13*b* by the brushes 46*b*.

As described above, the cleaning sheet 46 includes the brushes 46*b* for cleaning, thereby further enhancing the cleanability in the image reading device 1.

Note that, instead of disposing the brushes 46*b* partly on the cleaning sheet 46, the cleaning sheet 46 may dispose the brushes 46*b* covering the whole surface of the base 46*a*. Further, in order to prevent instant impact between the brushes 46*b* of the cleaning sheet 46 and each of the exposure glass 12 and the background switching revolver 13, the distance X from the leading end of the base 46*a* in the conveyance direction of the cleaning sheet 46 to the first brush 46*b* of the brushes 46*b* may be sufficiently obtained.

Next, a description is given of the image reading device according to a third embodiment of the present disclosure, with reference to FIGS. 9A to 10B.

Figure 9A:
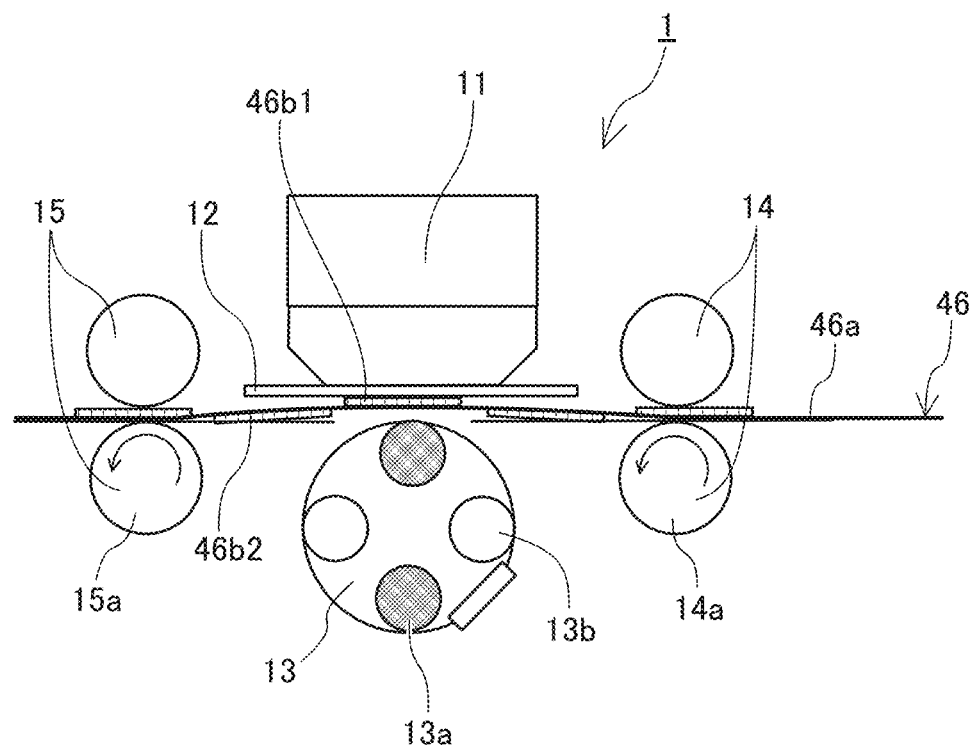
FIGS. 9A and 9B are side views, each illustrating an image reading device according to a third embodiment of the present disclosure, in a cleaning operation performed on the image reading device.
Figure 9B:
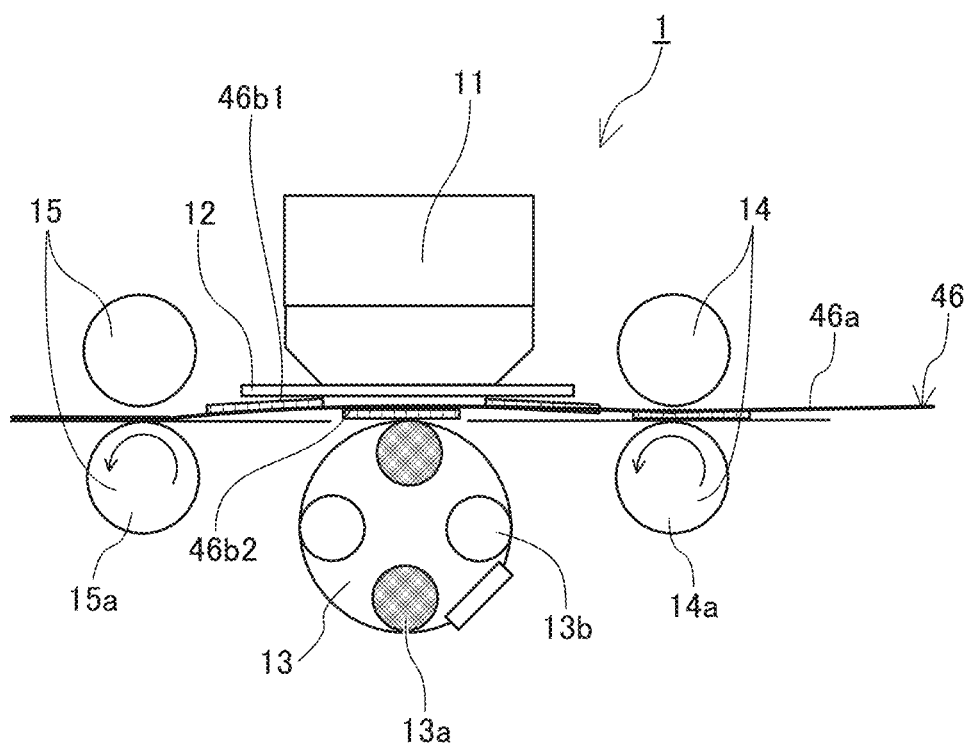

FIGS. 9A and 9B are side views, each illustrating the image reading device according to the third embodiment of the present disclosure, in a cleaning operation performed on the image reading device.

Figure 10A:
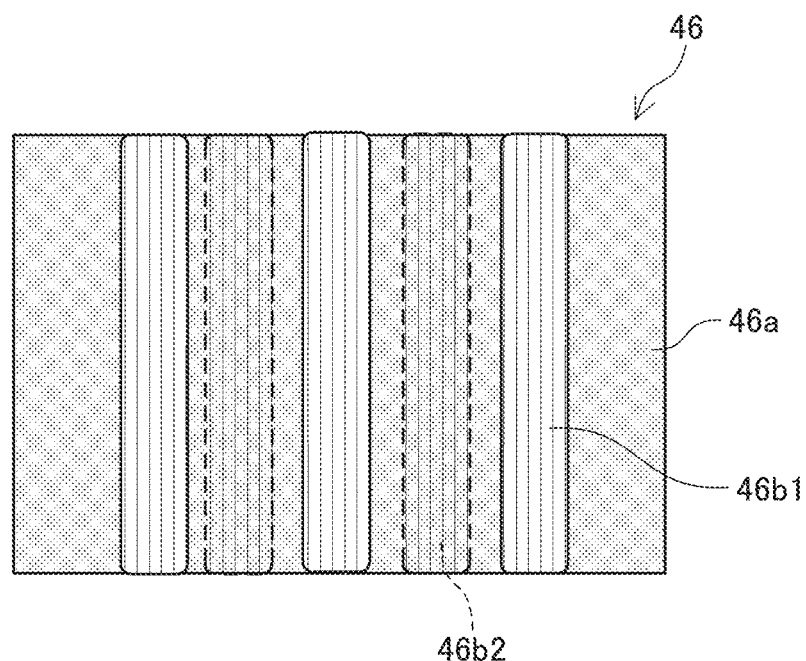
FIGS. 10A and 10B are diagrams, each illustrating a cleaning sheet used in the image reading device of FIGS. 9A and 9B.
Figure 10B:
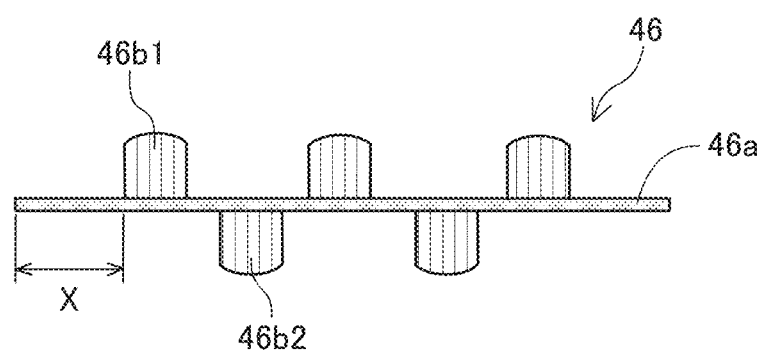

FIGS. 10A and 10B are diagrams, each illustrating the cleaning sheet used in the image reading device of FIGS. 9A and 9B.

As illustrated in FIGS. 10A and 10B, the cleaning sheet 46 used in the present embodiment includes the base 46*a* and the brushes 46*b* for cleaning (upper brushes 46*b*1 and lower brushes 46*b*2) on both sides, which are front and back sides, of the base 46*a*, along the conveyance direction of the cleaning sheet 46. Specifically, the upper brushes 46*b*1 are on the front side of the base 46*a* and the lower brushes 46*b*2 are on the back side of the base 46*a*. The upper brushes 46*b*1 and the lower brushes 46*b*2 are aligned in a belt-like shape in the direction that intersects with the conveyance direction of the cleaning sheet 46. The upper brushes 46*b*1 and the lower brushes 46*b*2 in FIGS. 10A and 10B are aligned in the direction orthogonal to the conveyance direction of the cleaning sheet 46. However, the upper brushes 46*b*1 and the lower brushes 46*b*2 may be aligned in the oblique direction to the conveyance direction of the cleaning sheet 46.

Further, in order to prevent instant impact between the upper brushes 46*b*1 of the cleaning sheet 46 and each of the exposure glass 12 and the background switching revolver 13, it is preferable to sufficiently obtain the distance X from the leading end of the base 46*a* in the conveyance direction of the cleaning sheet 46 to the first upper brush 46*b*1 of the upper brushes 46*b*1.

When cleaning the exposure glass 12 and the background switching revolver 13 by the cleaning sheet 46 illustrated in FIGS. 10A and 10B, as in the first embodiment, the number of rotations of the downstream conveyance roller 15*a* is smaller than the number of rotations of the upstream conveyance roller 14*a*.

As a result, as illustrated in FIG. 9A, the cleaning sheet 46 is bent to be convex (outward) toward the exposure glass 12, so that the upper brushes 46*b*1 on the upper surface of the cleaning sheet 46 may be brought to contact the exposure glass 12. In addition, as illustrated in FIG. 9B, since the lower brushes 46*b*2 on the lower surface of the cleaning sheet 46 is projected downwardly from the base 46*a*, the lower brushes 46*b*2 may be brought to contact the circumferential surface of the background switching revolver 13 (i.e., the circumferential surface of the black background roller 13*a* or the circumferential surface of the white background roller 13*b*).

The cleaning sheet 46 is conveyed with such a configuration, so that the upper brushes 46*b*1 wipe and clean the surface of the exposure glass 12 and the lower brushes 46*b*2 wipe and clean the circumferential surface of the background switching revolver 13, in other words, the circumferential surface of the black background roller 13*a* or the circumferential surface of the white background roller 13*b*.

As described above, since the cleaning sheet 46 includes the upper brushes 46b1 and the lower brushes 46b2, the exposure glass 12 (transparent member) and the background switching revolver 13 (opposing member) are cleaned at one time in one conveyance.

Further, in the present embodiment, the upper brushes 46b1 on one side (i.e., upper surface) of the base 46a of the cleaning sheet 46 are disposed at respective positions different from respective positions of the lower brushes 46b2 on the other side (i.e., lower surface) of the base 46a of the cleaning sheet 46 in a zigzag (staggered) pattern as viewed in FIG. 10B.

As a result, in cleaning with the cleaning sheet 46, the thickness of the cleaning sheet 46 equals the sum of the thickness of the base 46a, the height of the upper brushes 46b1, and the height of the lower brushes 46b2. This structure restrains a decrease in conveyance of the cleaning sheet 46.

Figure 11A:
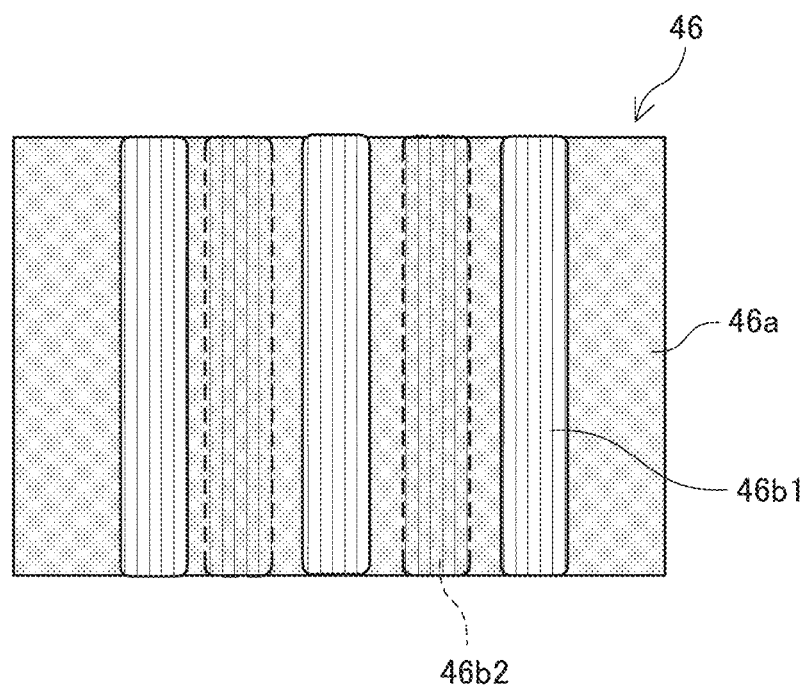
FIGS. 11A and 11B are diagrams, each illustrating a cleaning sheet used in a cleaning operation performed on an image reading device according to a fourth embodiment of the present disclosure.
Figure 11B:
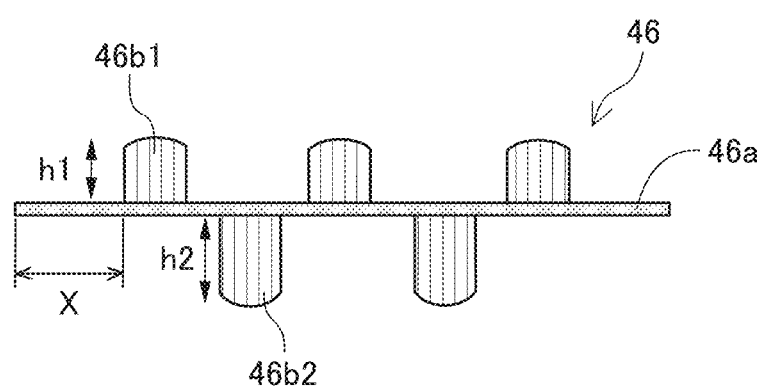

Next, a description is given of the image reading device according to a fourth embodiment of the present disclosure, with reference to FIGS. 11A and 11B.

FIGS. 11A and 11B are diagrams, each illustrating the cleaning sheet used in the cleaning operation performed on the image reading device according to the fourth embodiment of the present disclosure.

As illustrated in FIGS. 11A and 11B, as in the third embodiment, the cleaning sheet 46 used in the present embodiment includes the base 46a and the brushes 46b (i.e., the upper brushes 46b1 and the lower brushes 46b2) on both sides, which are front and back sides, of the base 46a of the cleaning sheet 46, along the conveyance direction of the cleaning sheet 46. Specifically, the upper brushes 46b1 are on one side (i.e., upper surface) of the base 46a and the lower brushes 46b2 are on the other side (i.e., lower surface) of the base 46a. The upper brushes 46b1 and the lower brushes 46b2 are aligned in a belt-like shape in the direction that intersects with the conveyance direction of the cleaning sheet 46. The upper brushes 46b1 and the lower brushes 46b2 in FIGS. 10A and 10B are aligned in the direction orthogonal to the conveyance direction of the cleaning sheet 46. However, the upper brushes 46b1 and the lower brushes 46b2 may be aligned in the oblique direction to the conveyance direction of the cleaning sheet 46.

The upper brushes 46b1 on the upper surface that contacts the exposure glass 12 and the lower brushes 46b2 on the lower surface that contacts the circumferential surface of the background switching revolver 13 have different heights (length) from each other. Specifically, the height (length) h2 of the lower brushes 46b2 on the lower surface of the cleaning sheet 46 is higher (longer) than the height (length) h1 of the upper brushes 46b1 on the upper surface of the cleaning sheet 46.

As a result, as in the third embodiment, when the cleaning sheet 46 is conveyed while the cleaning sheet 46 is bent so as to be convex (outward) toward the exposure glass 12, the lower brushes 46b2 reliably contact the circumferential surface of the background switching revolver 13, thereby restraining defect cleaning of the exposure glass 12 and the background switching revolver 13 included in the image reading device 1.

Note that a flame-retardant material such as nylon may be preferably used for the brushes 46b including the upper brushes 46b1 and the lower brushes 46b2 of the cleaning sheet 46. This structure of the brushes 46b (upper brushes 46b1, lower brushes 46b2) prevents thermal deformation on the cleaning sheet 46 when, for example, the cleaning sheet 46 is conveyed through a fixing device of an image forming apparatus. In this case, the cleaning sheet 46 may be conveyed through the fixing device under control that the fixing temperature in the fixing device is set to be relatively low. At this time, in order to prevent contamination on the background of sheet S in a secondary transfer portion, a primary transfer portion may be fully separated from sheet S or the transfer bias of the secondary transfer portion and the transfer bias of the primary transfer portion are highly reduced.

Figure 12:
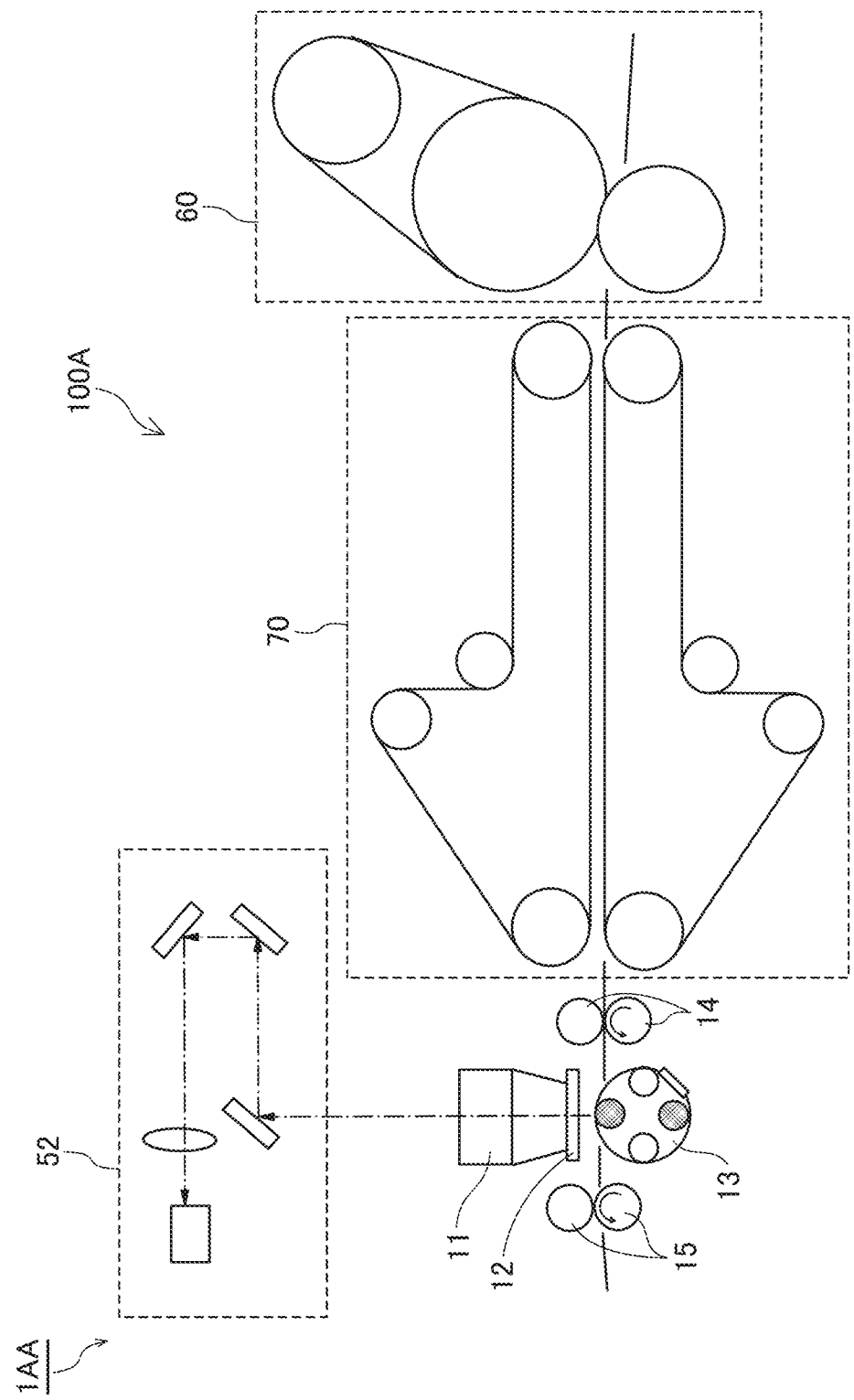
FIG. 12 is a side view of an image forming apparatus according to a fifth embodiment of the present disclosure.

Next, a description is given of an image forming apparatus according to a fifth embodiment of the present disclosure, with reference to FIG. 12.

FIG. 12 is a side view of an image forming apparatus according to the fifth embodiment of the present disclosure.

An image forming apparatus 100A according to the present embodiment includes an image reading device 1AA, a fixing unit 60, and a cooling unit 70. In the image forming apparatus 100A according to the present embodiment, after an image is fixed to a sheet in the fixing unit 60, the sheet is cooled by the cooling unit 70, then the image on the sheet is read by the image reading device 1AA.

The image reading device 1AA includes an inline sensor 52 of a reduction optical system.

Figure 13:
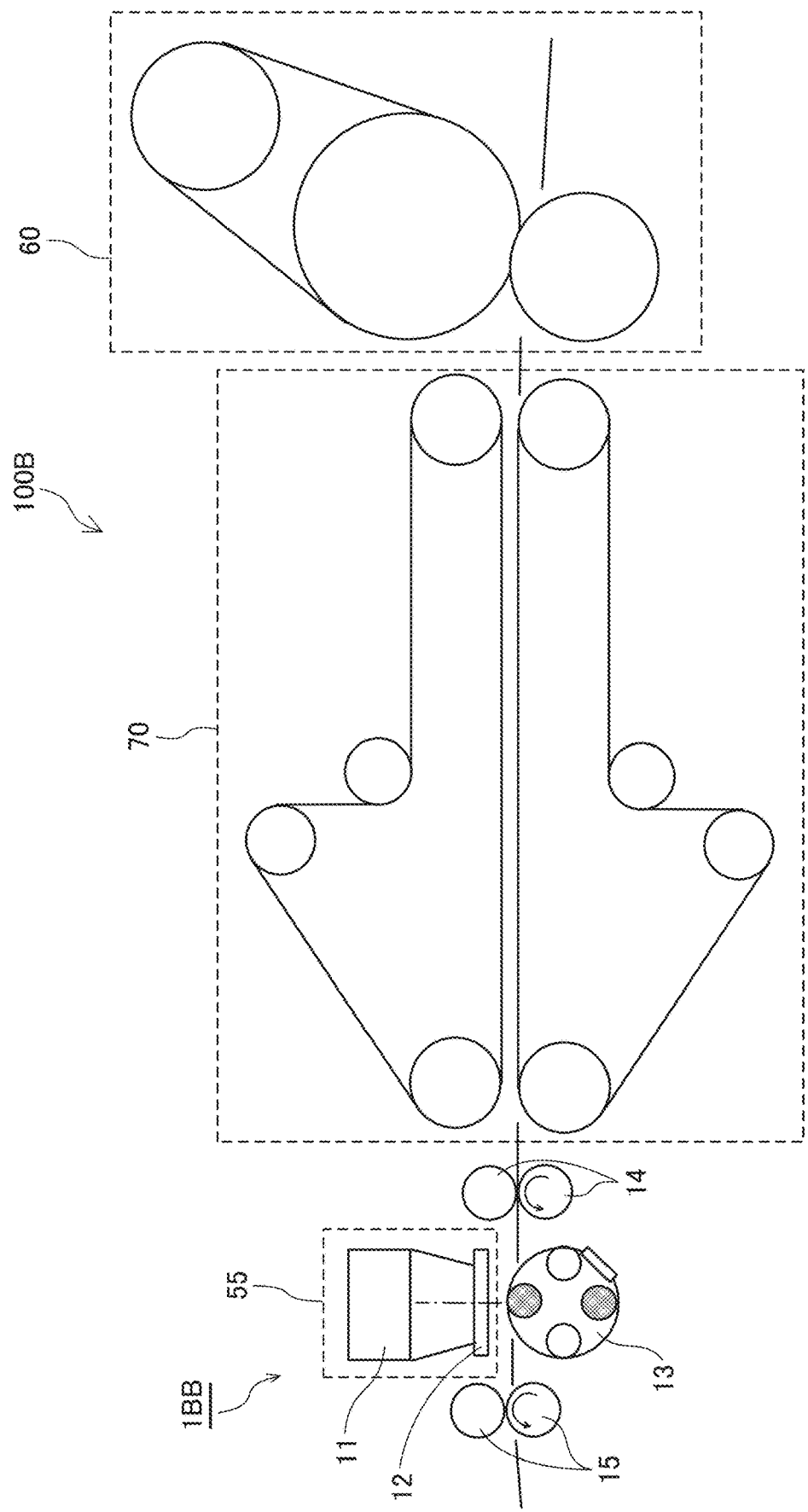
FIG. 13 is a side view of an image forming apparatus according to a sixth embodiment of the present disclosure.

Next, a description is given of an image forming apparatus according to a sixth embodiment of the present disclosure, with reference to FIG. 13.

FIG. 13 is a side view of an image forming apparatus according to the sixth embodiment of the present disclosure.

An image forming apparatus 100B according to the present embodiment includes an image reading device 1BB, the fixing unit 60, and the cooling unit 70. In the image forming apparatus 100B according to the present embodiment, after an image is fixed to a sheet in the fixing unit 60, the sheet is cooled by the cooling unit 70, then the image on the sheet is read by the image reading device 1BB.

The image reading device 1BB includes an inline sensor 55 of an equal magnification optical system.

Figure 14:
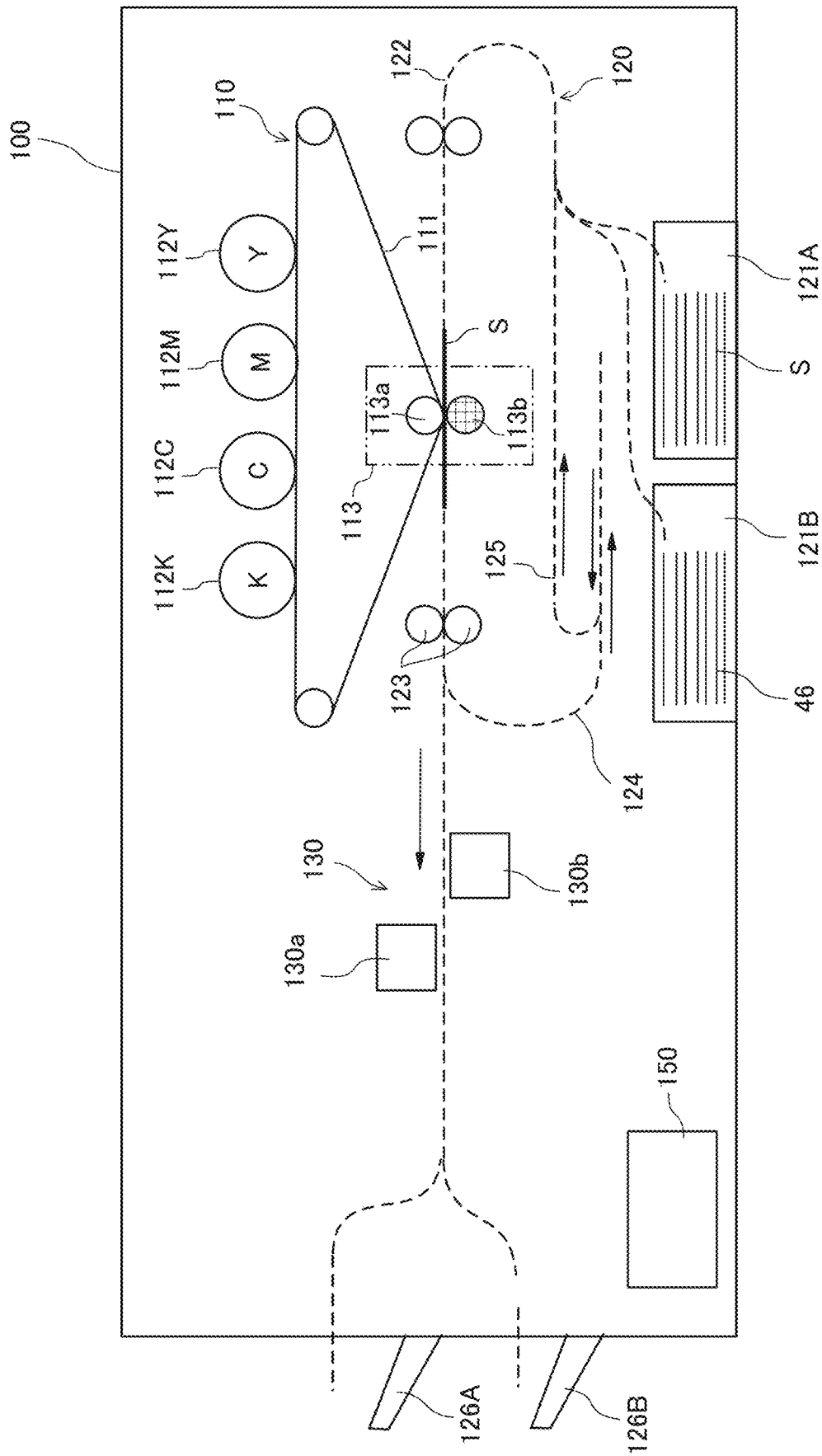
FIG. 14 is a side view of an image forming apparatus according to a seventh embodiment of the present disclosure.
Figure 15:
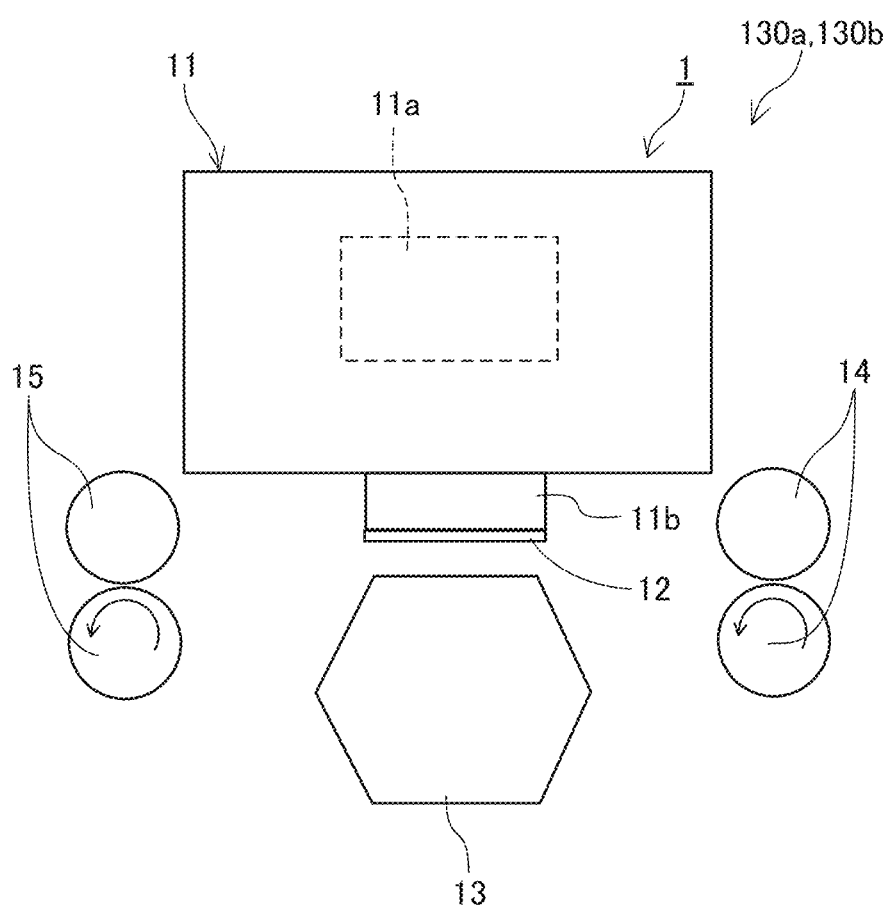
FIG. 15 is a side view of an image reading device included in the image forming apparatus of FIG. 14.

Next, a description is given of an image forming apparatus according to a seventh embodiment of the present disclosure, with reference to FIGS. 14 and 15.

FIG. 14 is a side view of an image forming apparatus according to the seventh embodiment of the present disclosure.

FIG. 15 is a side view of an image reading device included in the image forming apparatus according to the seventh embodiment of the present disclosure.

An image forming apparatus 100 includes an image forming device 110, a sheet conveyor 120, an image reader 130, and a controller 150. The controller 150 controls an overall operation of the image forming apparatus 100 and a series of processes for forming an image on a sheet S to be used for image formation. The controller 150 includes the cleaning controller 20 described in the above-described embodiments.

The image forming device 110 includes photoconductor drums 112 (namely, photoconductor drums 112Y, 112M, 112C, and 112K) to form latent images corresponding to different single color images. In the image forming device 110 according to the present embodiment, the photoconductor drums 112Y, 112M, 112C, and 112K for forming latent images corresponding to images of respective colors are disposed so as to correspond to image forming processes using image forming materials of respective colors such as toners of yellow (Y), magenta (M), cyan (C), and black (K).

The photoconductor drums 112 are disposed along an intermediate transfer belt 111 that is an endless belt included in a movement assembly. The intermediate transfer belt 111 is wound around at least one drive roller and a plurality of driven rollers and moves between a primary transfer position and a secondary transfer position. The first transfer position is a position where an image (toner image) developed on the photoconductor drum 112 is transferred and the secondary transfer position is a position where the image (toner image) is transferred to the sheet S.

A transfer unit 113 is disposed at the secondary transfer position. The transfer unit 113 includes a transfer roller 113a and a counter roller 113b disposed opposite the transfer roller 113a. In the transfer unit 113, the toner image is transferred from the intermediate transfer belt 111 to the sheet S to form an image at a predetermined position (i.e., image forming position) on the sheet S. A gap is provided between the transfer roller 113a and the counter roller 113b, so that the intermediate transfer belt 111 and the sheet S pass through the gap while being nipped between the transfer roller 113a and the counter roller 113b. An image is transferred onto the sheet S while the sheet S is nipped in the gap between the transfer roller 113a and the counter roller 113b and conveyed in the conveyance direction of the sheet S (sub-scanning direction).

The sheet conveyor 120 includes a sheet feed tray 121A and a sheet feed tray 121B that functions as a sheet feeder. The sheet feed tray 121A loads sheets to be used for image formation. The sheet feed tray 121B loads cleaning sheets 46. In other words, the cleaning sheet 46 is fed from a sheet feeder different from a sheet feeder loading the sheet S on which an image is formed.

The sheet conveyor 120 further includes a conveyance passage 122, a fixing roller pair 123, a conveyance passage switcher 124, and a reversal passage 125. The conveyance passage 122 is defined by multiple roller pairs to convey the cleaning sheet 46. The fixing roller pair 123 is disposed downstream from the transfer unit 113 in the conveyance direction of the sheet S.

When the image forming process is performed, under the predetermined control processing by the controller 150, the sheet S loaded in the sheet feed tray 121A is separated by a pickup roller and conveyed along the conveyance passage 122. Then, the sheet S reaches the transfer unit 113.

As the sheet S reaches the transfer unit 113, the transfer process is performed. That is, the sheet S is conveyed in the predetermined conveyance direction while being nipped between the surface of the intermediate transfer belt 111 and the counter roller 113b. The transfer roller 113a biases (presses) the intermediate transfer belt 111 toward the counter roller 113b. When the sheet S passes between the intermediate transfer belt 111 and the counter roller 113b, an image forming material on the surface of the intermediate transfer belt 111 is transferred onto the sheet S. In this transfer process, an image is formed on one side (first face) of the sheet S.

The sheet S having the image on the first face is further conveyed, so that the image is fixed to the sheet S by the fixing roller pair 123. Then, the sheet S is conveyed to the conveyance passage switcher 124 disposed downstream from fixing roller pair 123 in the conveyance direction of the sheet S. The conveyance passage switcher 124 reverses the travel direction of the sheet S and conveys the reversed sheet S to the reversal passage 125. Thereafter, the sheet S is conveyed again to the transfer position of the transfer roller 113a so that the image formed on the intermediate transfer belt 111 is transferred onto the second face of the sheet S.

The sheet S having the image on the second face is further conveyed, so that the image on the second face of the sheet S is fixed to the sheet S by the fixing roller pair 123. Then, the sheet S is conveyed to the image reader 130 disposed downstream from the fixing roller pair 123 in the conveyance direction of the sheet S.

The image reader 130 includes a reader 130a and a reader 130b. The reader 130a is constructed by an image reading device that reads the first face of the sheet S. The reader 130b is constructed by an image reading device that reads the second face of the sheet S.

The sheet S for image formation that has passed through the image reader 130 is ejected to a sheet ejection tray 126A that functions as a sheet stacker. The cleaning sheet 46 that has passed through the image reader 130 is ejected to a sheet ejection tray 126B that functions as a sheet stacker.

As described above, the sheet S for image formation and cleaning sheet 46 are ejected to different sheet ejection trays. By so doing, even when a cleaning operation is performed in continuous printing, the cleaning sheet 46 is prevented from being mixed into the sheets S for image formation.

Each of the readers 130a and 130b of the image reader 130 includes the image reading device 1. The image reading device 1 (readers 130a and 130b) includes the reading unit 11 provided with an irradiation unit 11b and a line image sensor. The irradiation unit 11b irradiates a sheet S with light when the sheet S passes through a reading position. The line image sensor includes imaging elements 11a that perform photoelectric conversion for each pixel. The imaging elements 11a are disposed in a one-dimensional shape along a direction orthogonal to the conveyance direction of the sheet S.

The image reading device 1 repeatedly performs a reading operation of an image for one line extending in the conveyance direction of the sheet S in accordance with a passing operation of the sheet S that passes the reading position, so as to read the image printed on the sheet S as a two-dimensional image.

The background switching revolver 13 is disposed at a position facing the reading unit 11 across the conveyance passage and reflects irradiation light with which the sheet S is irradiated when reading an image.

The exposure glass 12 that functions as a transparent member is disposed on the front face of the reading unit 11 and is disposed facing the background switching revolver 13. The exposure glass 12 penetrates light emitted from the reading unit 11 and reflected light returning after the emitted light is reflected by the background switching revolver 13 and the sheet S.

Figure 16:
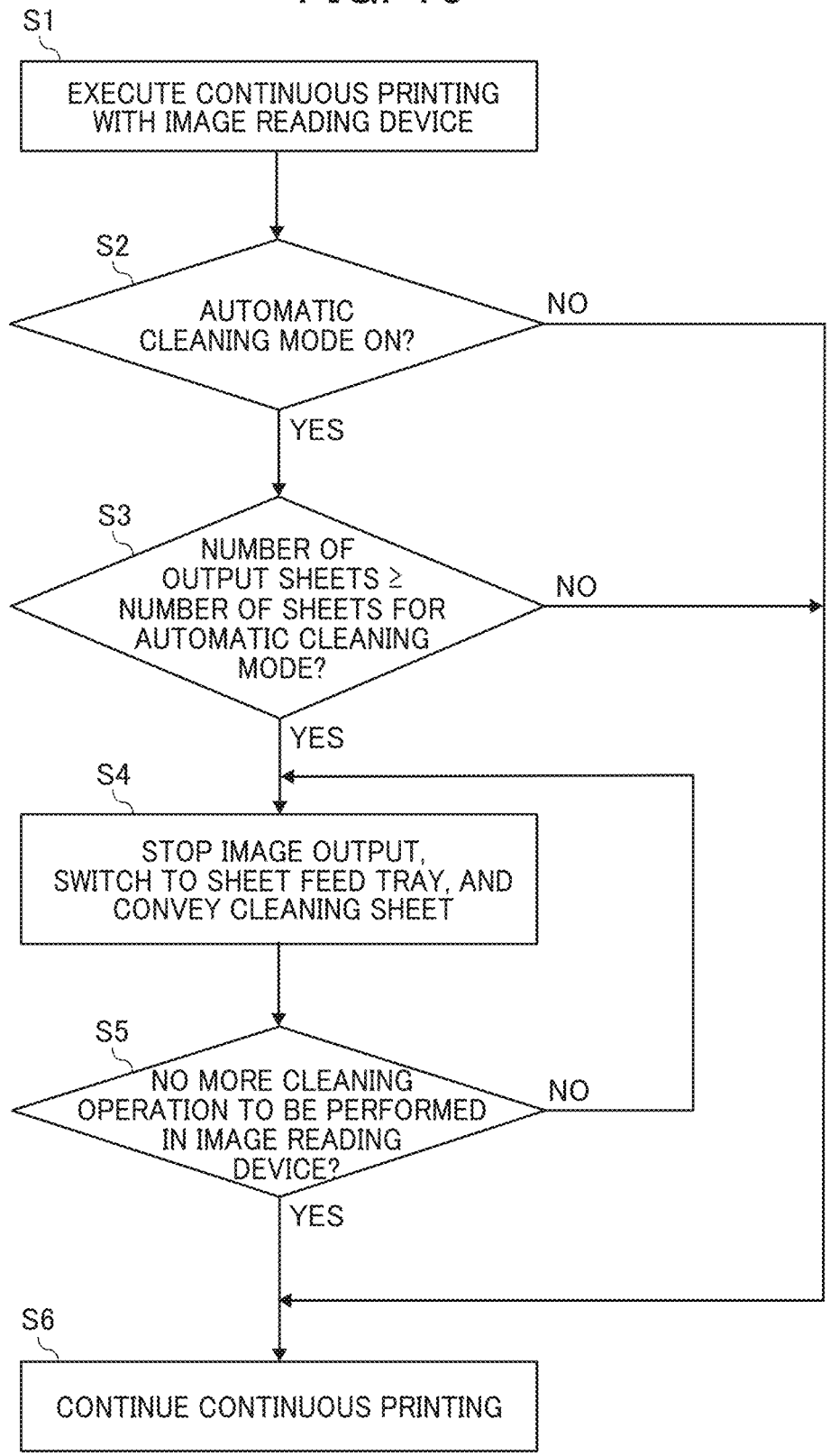
FIG. 16 is a flowchart of a control flow in a cleaning operation in continuous printing executed by a controller according to the seventh embodiment.

Next, a description is given of control of a cleaning operation in continuous printing by a controller 150 according to the present embodiment, with reference to a flowchart in FIG. 16.

FIG. 16 is a flowchart of a control flow in a cleaning operation in continuous printing executed by a controller according to the seventh embodiment.

The controller 150 executes continuous printing while detecting a defect image (abnormal image) and correcting a position at which an image is formed or a color tone, based on the reading result of the sheet S by the image reading device 1 (reading device) (step S1, hereinafter referred to as "S1").

At this time, the cleaning sheet 46 is conveyed and the controller 150 determines whether an automatic cleaning mode is ON or OFF (S2). In the automatic cleaning mode, the cleaning sheet 46 cleans the surface of the exposure glass 12 of the image reading device 1 or the surface of the background switching revolver 13 of the image reading device 1.

When the automatic cleaning mode is ON (YES in S2), the controller 150 then determines whether the number of output sheets (number of printed sheets) is equal to or greater than the predetermined number of sheets for entering the automatic cleaning mode (S3).

At this time, when the number of output sheets is equal to or greater than the predetermined number of sheets for entering the automatic cleaning mode (YES in S3), the image output is stopped and, for example, the cleaning sheet 46 with the brushes 46b is fed and conveyed from the sheet feed tray 121B, and then the surface of the exposure glass 12 or the surface of the background switching revolver 13 is cleaned by the cleaning sheet 46 (S4).

Thereafter, the controller 150 determines whether no more cleaning operation is to be performed in the image reading device 1 (reading device) (S5). When another cleaning operation is to be performed in the image reading device 1 (NO in S5), the process goes back to S4 to repeat the operation in S4 until it is determined that no more cleaning operation is to be performed.

When it is determined that no more cleaning operation is to be performed in the image reading device 1 (YES in S5), continuous printing is continued (S6). When the automatic cleaning mode is not ON (NO in S2) or when the number of output sheets is not equal to or greater than the predetermined number of sheets for entering the automatic cleaning mode (NO in S3), continuous printing is continued (S6).

As described above, since the image reading device 1 has a configuration that automatically enters the automatic cleaning mode and performs the cleaning operation with the cleaning sheet, a preferable image is formed reliably. Note that entering the automatic cleaning mode may be performed, for example, manually or at the end of the job.

Figure 17:
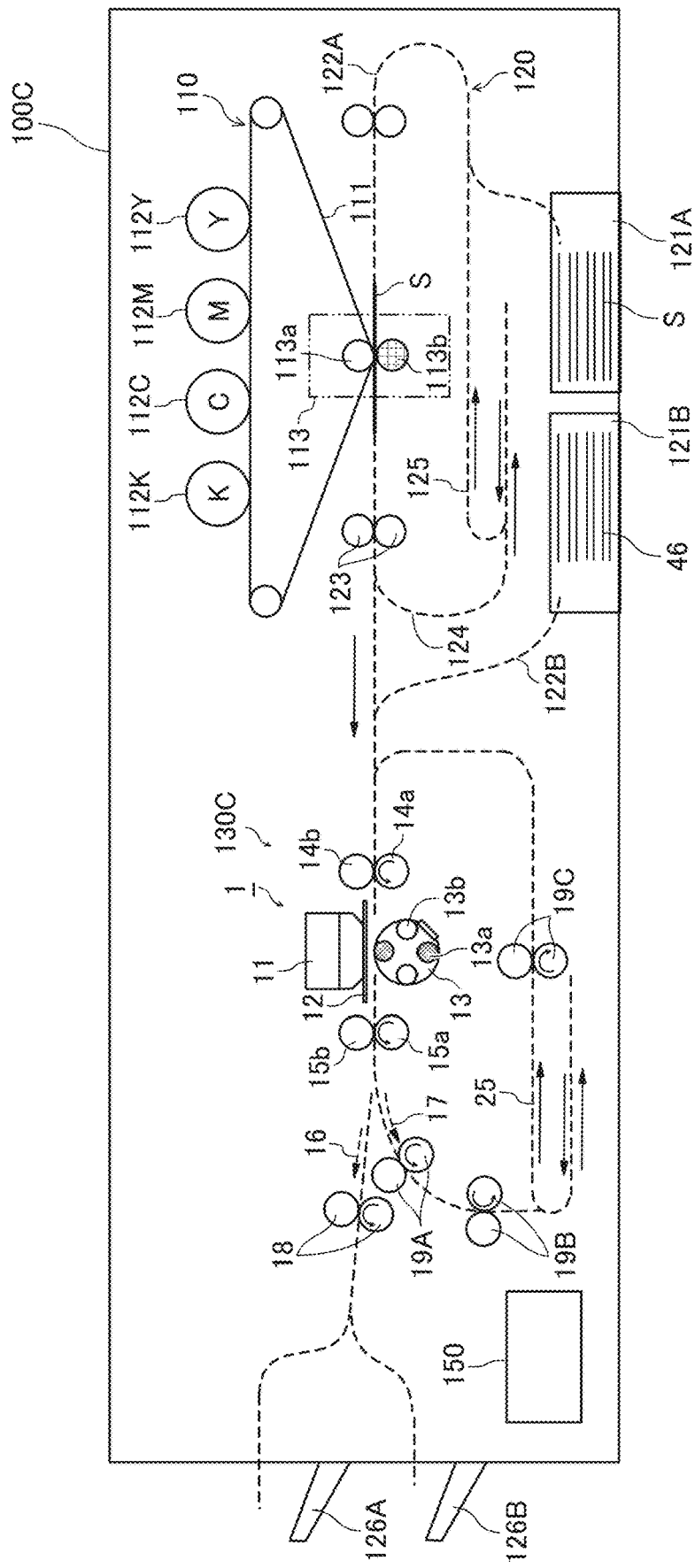
FIG. 17 is a side view of an image forming apparatus according to an eighth embodiment of the present disclosure.

Next, a description is given of an image forming apparatus according to an eighth embodiment of the present disclosure, with reference to FIG. 17.

FIG. 17 is a side view of an image forming apparatus according to the eighth embodiment of the present disclosure.

An image forming apparatus 100C includes the image forming device 110, the sheet conveyor 120, an image reader 130C, and the controller 150. The controller 150 controls an overall operation of the image forming apparatus 100C and a series of processes for forming an image on a sheet S to be used for image formation. The controller 150 includes the cleaning controller 20 described in the above-described embodiments.

The image forming device 110 includes photoconductor drums 112 (namely, photoconductor drums 112Y, 112M, 112C, and 112K) to form latent images corresponding to different single color images. In the image forming device 110 according to the present embodiment, the photoconductor drums 112Y, 112M, 112C, and 112K for forming latent images corresponding to images of respective colors are disposed so as to correspond to image forming processes using image forming materials of respective colors such as toners of yellow (Y), magenta (M), cyan (C), and black (K).

The photoconductor drums 112Y, 112M, 112C, and 112 are disposed along the intermediate transfer belt 111 that is an endless belt included in the movement assembly. The intermediate transfer belt 111 is wound around at least one drive roller and a plurality of driven rollers and moves between a primary transfer position and a secondary transfer position. The first transfer position is a position where an image (toner image) developed on the photoconductor drum 112 is transferred and the secondary transfer position is a position where the image (toner image) is transferred to the sheet S.

The transfer unit 113 is disposed at the secondary transfer position. The transfer unit 113 includes the transfer roller 113a and the counter roller 113b disposed facing the transfer roller 113a. In the transfer unit 113, the toner image is transferred from the intermediate transfer belt 111 to the sheet S to form an image at a predetermined position (i.e., image forming position) on the sheet S. A gap is provided between the transfer roller 113a and the counter roller 113b, so that the intermediate transfer belt 111 and the sheet S pass through the gap while being nipped between the transfer roller 113a and the counter roller 113b. An image is transferred onto the sheet S while the sheet S is nipped in the gap between the transfer roller 113a and the counter roller 113b and conveyed in the conveyance direction of the sheet S (sub-scanning direction).

The sheet conveyor 120 includes the sheet feed tray 121A that functions as a first sheet feeder and the sheet feed tray 121B that functions as a second sheet feeder. The sheet feed tray 121A loads sheets to be used for image formation. The sheet feed tray 121B loads cleaning sheets 46. In other words, the cleaning sheet 46 is fed from a sheet feeder different from a sheet feeder loading the sheet S on which an image is formed.

The sheet conveyor 120 receives sheets from the sheet feed tray 121A and includes a conveyance passage 122A, the fixing roller pair 123, the conveyance passage switcher 124, and the reversal passage 125. The conveyance passage 122A is defined by multiple roller pairs to convey the sheet S. The fixing roller pair 123 is disposed downstream from the transfer unit 113 in the conveyance direction of the sheet S. The sheet conveyor 120 also receives sheets from the sheet feed tray 121B and includes a conveyance passage 122B along which the cleaning sheet 46 is conveyed.

When the image forming process is performed, under the predetermined control processing by the controller 150, the sheet S loaded in the sheet feed tray 121A is separated by the pickup roller and then conveyed along the conveyance passage 122A. Then, the sheet S reaches the transfer unit 113.

As the sheet S reaches the transfer unit 113, the transfer process is performed. That is, the sheet S is conveyed in the predetermined conveyance direction while being nipped between the surface of the intermediate transfer belt 111 and the counter roller 113b. The transfer roller 113a biases (presses) the intermediate transfer belt 111 toward the counter roller 113b. When the sheet S passes between the intermediate transfer belt 111 and the counter roller 113b, an image forming material on the surface of the intermediate transfer belt 111 is transferred onto the sheet S. In this transfer process, an image is formed on one side (first face) of the sheet S.

The sheet S having the image on the first face is further conveyed, so that the image is fixed to the sheet S by the fixing roller pair 123. Then, the sheet S is conveyed to the conveyance passage switcher 124 disposed downstream from fixing roller pair 123 in the conveyance direction of the sheet S. The conveyance passage switcher 124 reverses the travel direction of the sheet S and conveys the reversed sheet S to the reversal passage 125. Thereafter, the sheet S is conveyed again to the transfer position of the transfer roller 113a so that the image formed on the intermediate transfer belt 111 is transferred onto the second face of the sheet S.

The sheet S having the image on the second face is further conveyed, and the image on the second face of the sheet S is fixed to the sheet S by the fixing roller pair 123. Then, the sheet S is conveyed to the image reading device 1 described in the above-described embodiments including the first embodiment.

The sheet S for image formation passes through the image reading device 1 where the first face of the sheet S is read. Then, the sheet S for image formation is reversed with the first face down by the reverse conveyance passage 17 and then is conveyed to the reversal passage 125. Then, the sheet S for image formation is conveyed by a conveyance roller pair 19C, to the image reading device 1 again. After the second face of the sheet S is read by the image reading device 1, the sheet S is ejected to the sheet ejection tray 126A.

The cleaning sheet 46 that is conveyed from the sheet feed tray 121B is conveyed through the conveyance passage 122B to the image reading device 1. The cleaning sheet 46 that has passed through the image reading device 1 is ejected to the sheet ejection tray 126B.

As described above, the sheet S for image formation and cleaning sheet 46 are ejected to different sheet ejection trays. By so doing, even when a cleaning operation is performed in continuous printing, the cleaning sheet 46 is prevented from being mixed into the sheets S for image formation.

The cleaning sheet 46 that is conveyed from the sheet feed tray 121B does not pass the transfer unit 113 and the fixing roller pair 123, thereby restraining damage on the cleaning sheet 46 due to toner contamination and heat.

Figure 18:
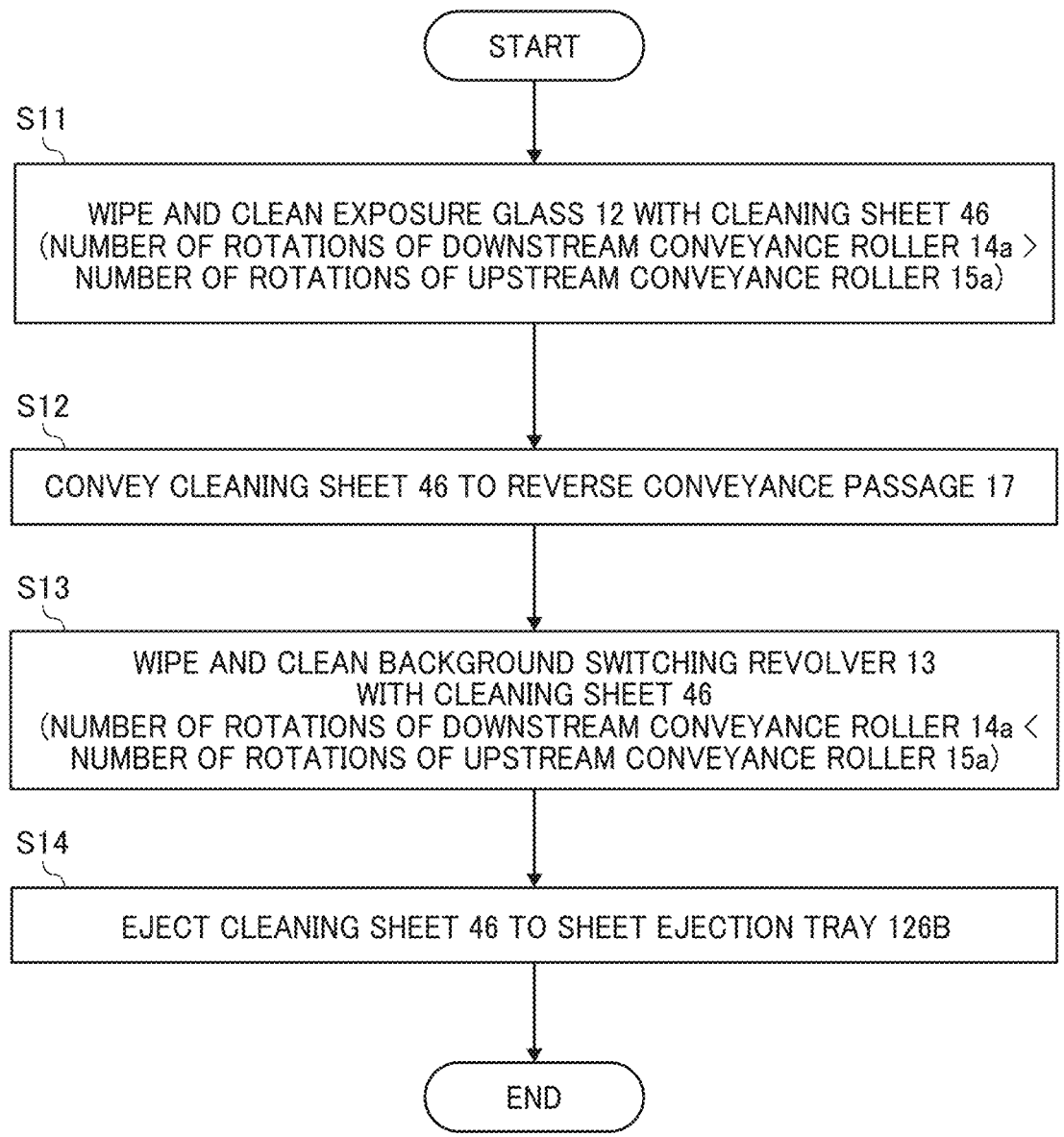
FIG. 18 is a flowchart of a first control flow in a cleaning operation executed by a controller according to the eighth embodiment.

Next, a description is given of control of a cleaning operation in continuous printing by a controller according to the present embodiment, with reference to a flowchart in FIG. 18.

FIG. 18 is a flowchart of a first control flow in a cleaning operation executed by a controller according to the present embodiment.

The first example is same as the examples illustrated in FIGS. 4A, 4B, 7A, and 7B of the first embodiment, in which one of the exposure glass 12 and the background switching revolver 13 (one of the cleaning targets) is wiped and cleaned in one conveyance of the cleaning sheet 46.

First, the cleaning sheet 46 that is conveyed from the sheet feed tray 121B is conveyed as illustrated in FIGS. 4A and 7A to wipe and clean the exposure glass 12 (S11). At this time, the controller 150 controls so that the number of rotations of the downstream conveyance roller 14a is greater than the number of rotations of the upstream conveyance roller 15a. In other words, the controller 150 controls to satisfy the following relation: the number of rotations of the downstream conveyance roller 14a>the number of rotations of the upstream conveyance roller 15a.

Thereafter, the cleaning sheet 46 is conveyed to the reverse conveyance passage 17 (S12), where the cleaning sheet 46 is reversed with the first face down and is conveyed to the image reading device 1 again. At this time, the cleaning sheet 46 is conveyed as illustrated in FIGS. 4B and 7B to wipe and clean the circumferential surface of the background switching revolver 13, that is, the circumferential surface of the black background roller 13a or the circumferential surface of the white background roller 13b (S13). At this time, the controller 150 controls so that the number of rotations of the downstream conveyance roller 14a is smaller than the number of rotations of the upstream conveyance roller 15a. In other words, the controller 150 controls to satisfy the following relation: the number of rotations of the downstream conveyance roller 14a<the number of rotations of the upstream conveyance roller 15a.

Thereafter, the cleaning sheet 46 is ejected to the sheet ejection tray 126B (S14).

Figure 19:
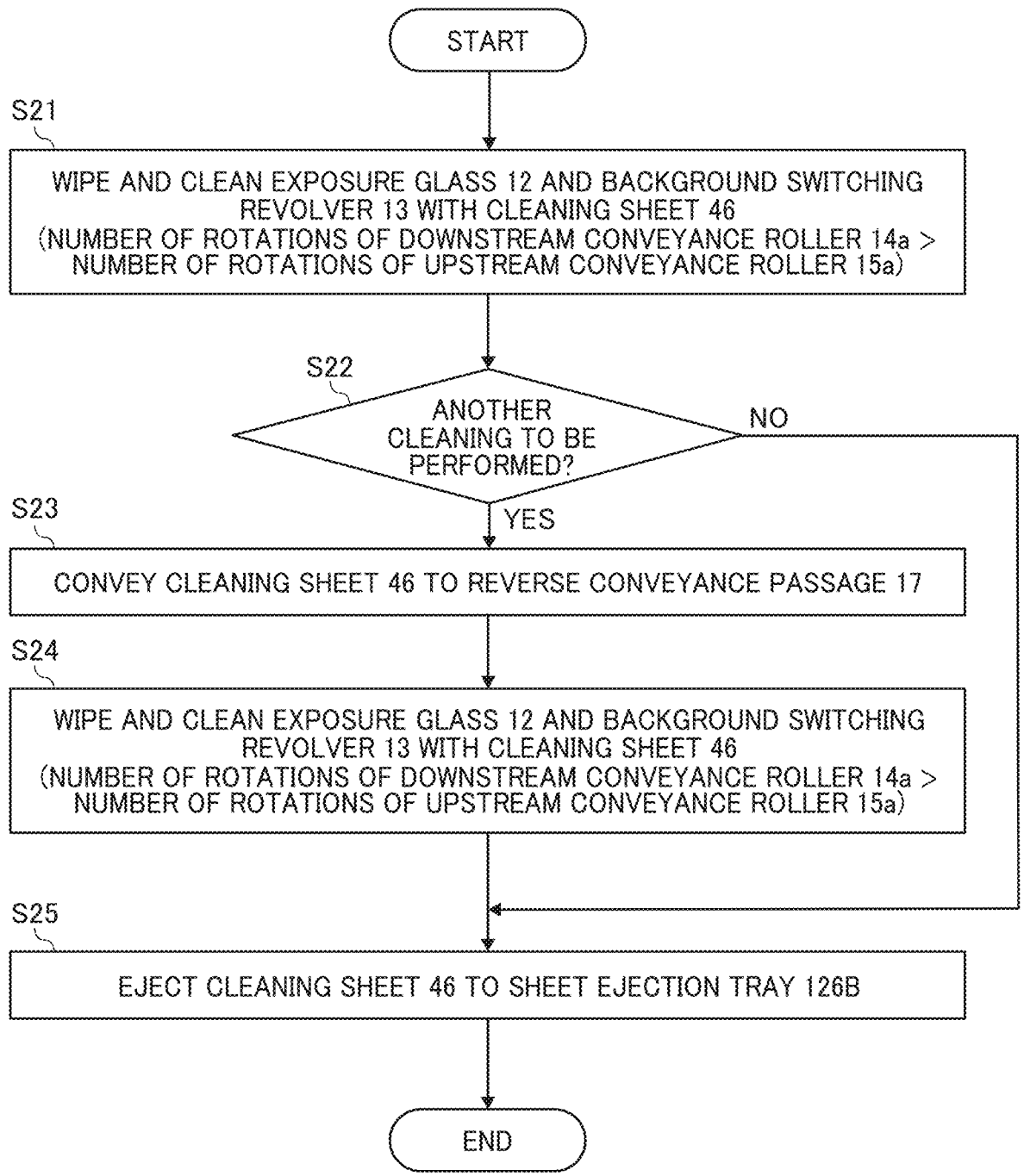
FIG. 19 is a flowchart of a second control flow in a cleaning operation executed by the controller according to the eighth embodiment.

Next, a description is given of control of a cleaning operation in continuous printing by a controller according to the present embodiment, with reference to a flowchart in FIG. 19.

FIG. 19 is a flowchart of a second control flow in a cleaning operation executed by the controller according to the present embodiment.

The second example is same as the examples illustrated in FIGS. 9A, 9B, 10A, and 10B of the third embodiment, in which the exposure glass 12 and the background switching revolver 13 (both cleaning targets) are wiped and cleaned in one conveyance of the cleaning sheet 46.

First, the cleaning sheet 46 that is conveyed from the sheet feed tray 121B, as illustrated in FIGS. 10A and 10B, is conveyed as illustrated in FIGS. 9A and 9B, so as to wipe and clean the exposure glass 12 and the circumferential surface of the background switching revolver 13, that is, the circumferential surface of the black background roller 13a or the circumferential surface of the white background roller 13b (S21). At this time, the controller 150 controls so that the number of rotations of the downstream conveyance roller 14a is greater than the number of rotations of the upstream conveyance roller 15a. In other words, the controller 150 controls to satisfy the following relation: the number of rotations of the downstream conveyance roller 14a>the number of rotations of the upstream conveyance roller 15a.

Then, the controller 150 determines whether or not another cleaning is to be performed (S22).

When another cleaning is not to be performed (NO in S22), the cleaning sheet 46 is ejected to the sheet ejection tray 126B (S25), and the process ends.

As described above, since the exposure glass 12 and the circumferential surface of the background switching revolver 13 (both cleaning targets) are wiped and cleaned in one conveyance of the cleaning sheet 46, the cleaning sheet 46 is not conveyed in the reverse conveyance passage 17 to be further conveyed to the image reading device 1 again.

On the other hand, when another cleaning is to be performed, in other words, multiple cleanings are to be performed (YES in S22), the cleaning sheet 46 is conveyed to the reverse conveyance passage 17 (S23). Then, the cleaning sheet 46 is conveyed as illustrated in FIGS. 9A and 9B, so as to wipe and clean the exposure glass 12 and the circumferential surface of the background switching revolver 13, that is, the circumferential surface of the black background roller 13a or the circumferential surface of the white background roller 13b (S24). At this time, the controller 150 controls so that the number of rotations of the downstream conveyance roller 14a is greater than the number of rotations of the upstream conveyance roller 15a. In other words, the controller 150 controls to satisfy the following relation: the number of rotations of the downstream conveyance roller 14a>the number of rotations of the upstream conveyance roller 15a.

Thereafter, the cleaning sheet 46 is ejected to the sheet ejection tray 126B (S25), and the process ends.

Note that the process of cleaning is completed after performing the cleaning operation twice. However, after completion of the cleaning in step S24, the process may return to step S22 in which the controller 150 determines whether further cleaning is to be performed or not. By so doing, the cleaning may be performed for three or more times.

Figure 20:
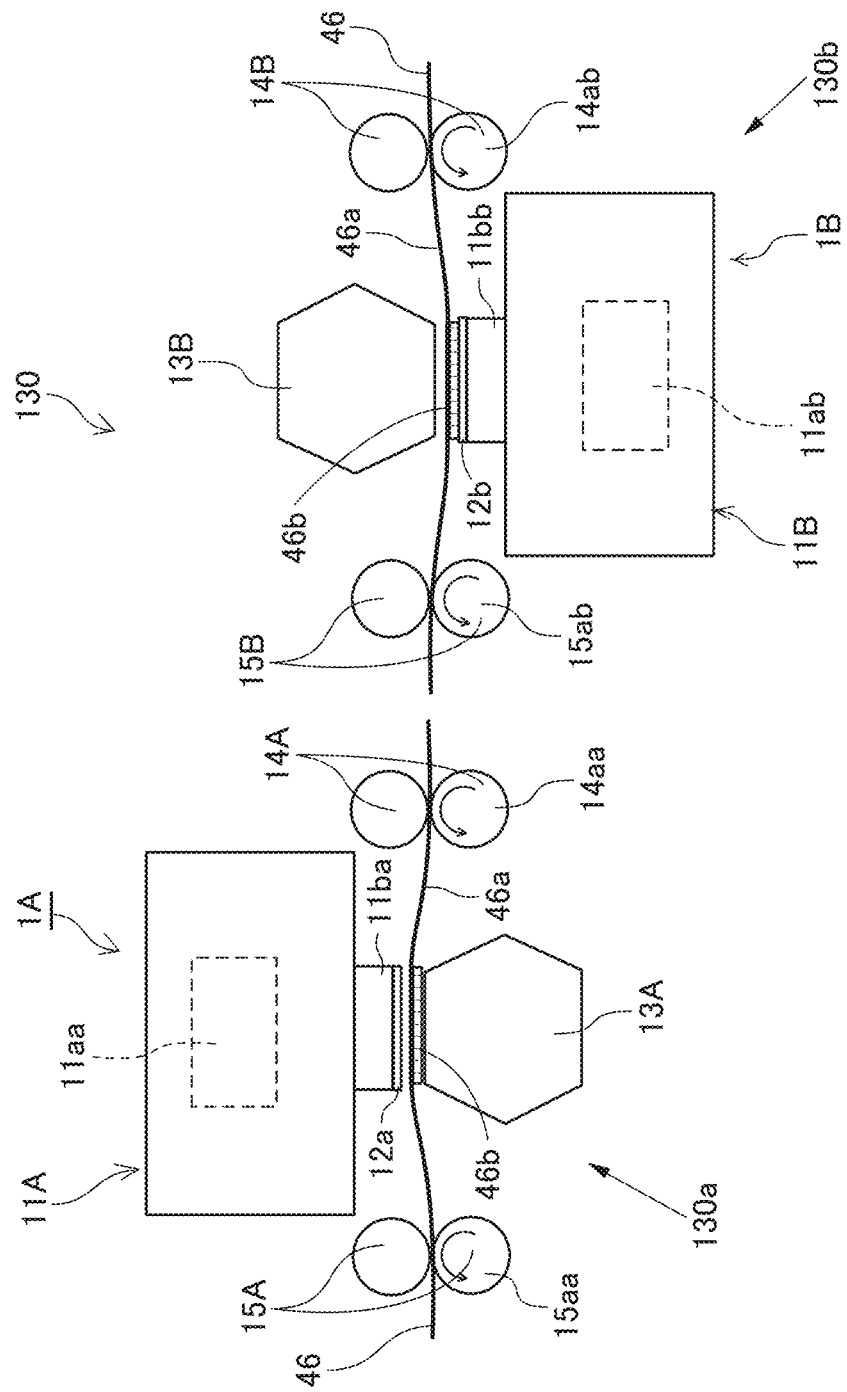
FIG. 20 is a side view of an image reader included in an image forming apparatus according to a ninth embodiment of the present disclosure.

Next, a description is given of an image reader included in an image forming apparatus according to a ninth embodiment of the present disclosure, with reference to FIG. 20.

FIG. 20 is a side view of an image reader included in an image forming apparatus according to the ninth embodiment of the present disclosure.

The configuration of the image forming apparatus according to the present embodiment is similar to the configuration of the image forming apparatus according to the seventh embodiment, except that the image forming apparatus according to the present embodiment includes an image reader 130 including two readers. The image reader 130 includes a downstream reader 130a and an upstream reader 130b. The upstream reader 130b is constructed by an image reading device 1B and the downstream reader 130a is constructed by an image reading device 1A.

The image reading device 1B includes an irradiation unit 11bb and a line image sensor. The irradiation unit 11bb irradiates a sheet S with light when the sheet S passes through a reading position. The line image sensor includes imaging elements 11ab that perform photoelectric conversion for each pixel. The imaging elements 11ab are disposed in a one-dimensional shape along a direction orthogonal to the conveyance direction of the sheet S.

The image reading device 1B repeatedly performs a reading operation of an image for one line extending in the conveyance direction of the sheet S in accordance with a passing operation of the sheet S that passes the reading position, so as to read the image printed on the sheet S as a two-dimensional image.

The background switching revolver 13B is disposed at a position facing the reading unit 11B across the conveyance passage and reflects irradiation light with which the sheet S is irradiated when reading an image.

An exposure glass 12b that functions as a transparent member is disposed on the front face of the reading unit 11B and is disposed facing the background switching revolver 13B. The exposure glass 12b penetrates light emitted from the reading unit 11B and reflected light returning after the emitted light is reflected by the background switching revolver 13B and the sheet S.

An upstream conveyance roller pair 14B including an upstream conveyance roller 14ab is disposed upstream from the reading unit 11B in the conveyance direction of the sheet S. A downstream conveyance roller pair 15B including a downstream conveyance roller 15ab is disposed downstream from the reading unit 11B in the conveyance direction of the sheet S.

The image reading device 1A includes an irradiation unit 11ba and a line image sensor. The irradiation unit 11ba irradiates a sheet S with light when the sheet S passes through a reading position. The line image sensor includes imaging elements 11aa that perform photoelectric conversion for each pixel. The imaging elements 11aa are disposed in a one-dimensional shape along a direction orthogonal to the conveyance direction of the sheet S.

The image reading device 1A repeatedly performs a reading operation of an image for one line extending in the conveyance direction of the sheet S in accordance with a passing operation of the sheet S that passes the reading position, so as to read the image printed on the sheet S as a two-dimensional image.

The background switching revolver 13A is disposed at a position facing the reading unit 11A across the conveyance passage and reflects irradiation light with which the sheet S is irradiated when reading an image.

An upstream conveyance roller pair 14A including an upstream conveyance roller 14aa is disposed upstream from the reading unit 11A in the conveyance direction of the sheet S. A downstream conveyance roller pair 15A including a downstream conveyance roller 15aa is disposed downstream from the reading unit 11A in the conveyance direction of the sheet S.

Figure 21:
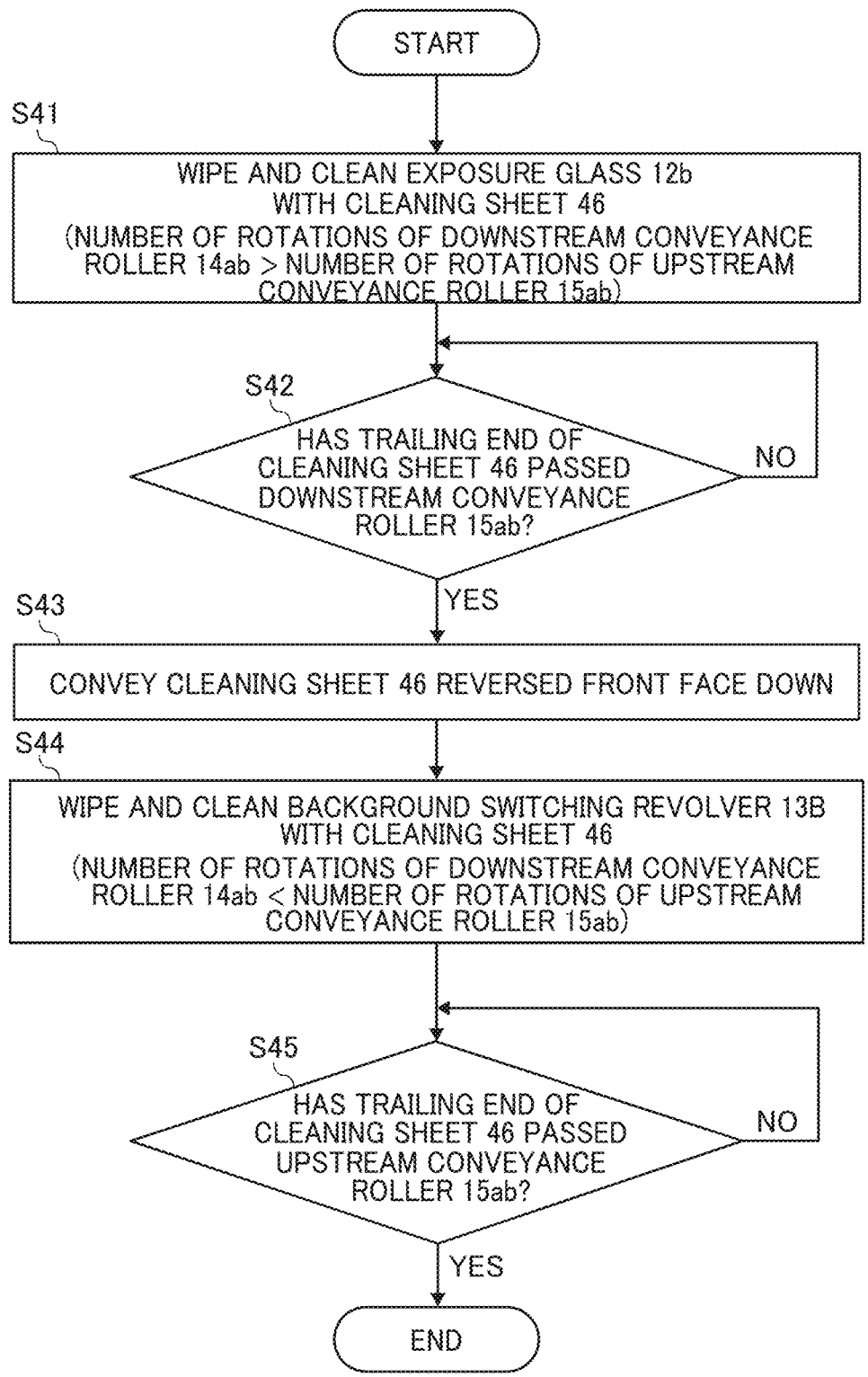
FIG. 21 is a flowchart of a control flow in a cleaning operation performed on upstream reader according to the ninth embodiment.

Next, a description is given of cleaning operations with respect to the upstream reader according to the present embodiment, with reference to a flowchart in FIG. 21.

FIG. 21 is a flowchart of a control flow in a cleaning operation performed on upstream reader according to the ninth embodiment of the present disclosure.

First, the cleaning sheet 46 that is conveyed from the sheet feed tray 121B is conveyed to wipe and clean the exposure glass 12b of the image reading device 1B that is disposed upstream in the conveyance direction of the cleaning sheet 46 in the image reader 130 in FIG. 20 (S41). At this time, the controller 150 controls so that the number of rotations of the downstream conveyance roller 14ab is greater than the number of rotations of the upstream conveyance roller 15ab. In other words, the controller 150 controls to satisfy the following relation: the number of rotations of the downstream conveyance roller 14ab>the number of rotations of the upstream conveyance roller 15ab.

Thereafter, the controller 150 determines whether the trailing end of the cleaning sheet 46 has passed the downstream conveyance roller 15ab (S42).

When the trailing end of the cleaning sheet 46 has not passed the downstream conveyance roller 15ab (NO in S42), step S42 is repeated until the trailing end of the cleaning sheet 46 passes the downstream conveyance roller 15ab. When the trailing end of the cleaning sheet 46 has passed the downstream conveyance roller 15ab (YES in S42), the cleaning sheet 46 that is reversed with the first face down is conveyed (S43).

The reversed cleaning sheet 46 wipes and cleans the circumferential surface of the background switching revolver 13B of the image reading device 1B disposed upstream in the image reader 130 in the conveyance direction of the cleaning sheet 46 (S44). At this time, the controller 150 controls so that the number of rotations of the downstream conveyance roller 14ab is smaller than the number of rotations of the upstream conveyance roller 15ab. In other words, the controller 150 controls to satisfy the following relation: the number of rotations of the downstream conveyance roller 14ab<the number of rotations of the upstream conveyance roller 15ab.

Thereafter, the controller 150 determines whether the trailing end of the cleaning sheet 46 has passed the downstream conveyance roller 15ab (S45). When the trailing end of the cleaning sheet 46 has not passed the downstream conveyance roller 15ab (NO in S45), step S45 is repeated until the trailing end of the cleaning sheet 46 passes the downstream conveyance roller 15ab. When the trailing end of the cleaning sheet 46 has passed the downstream conveyance roller 15ab (YES in S45), the process ends.

Figure 22:
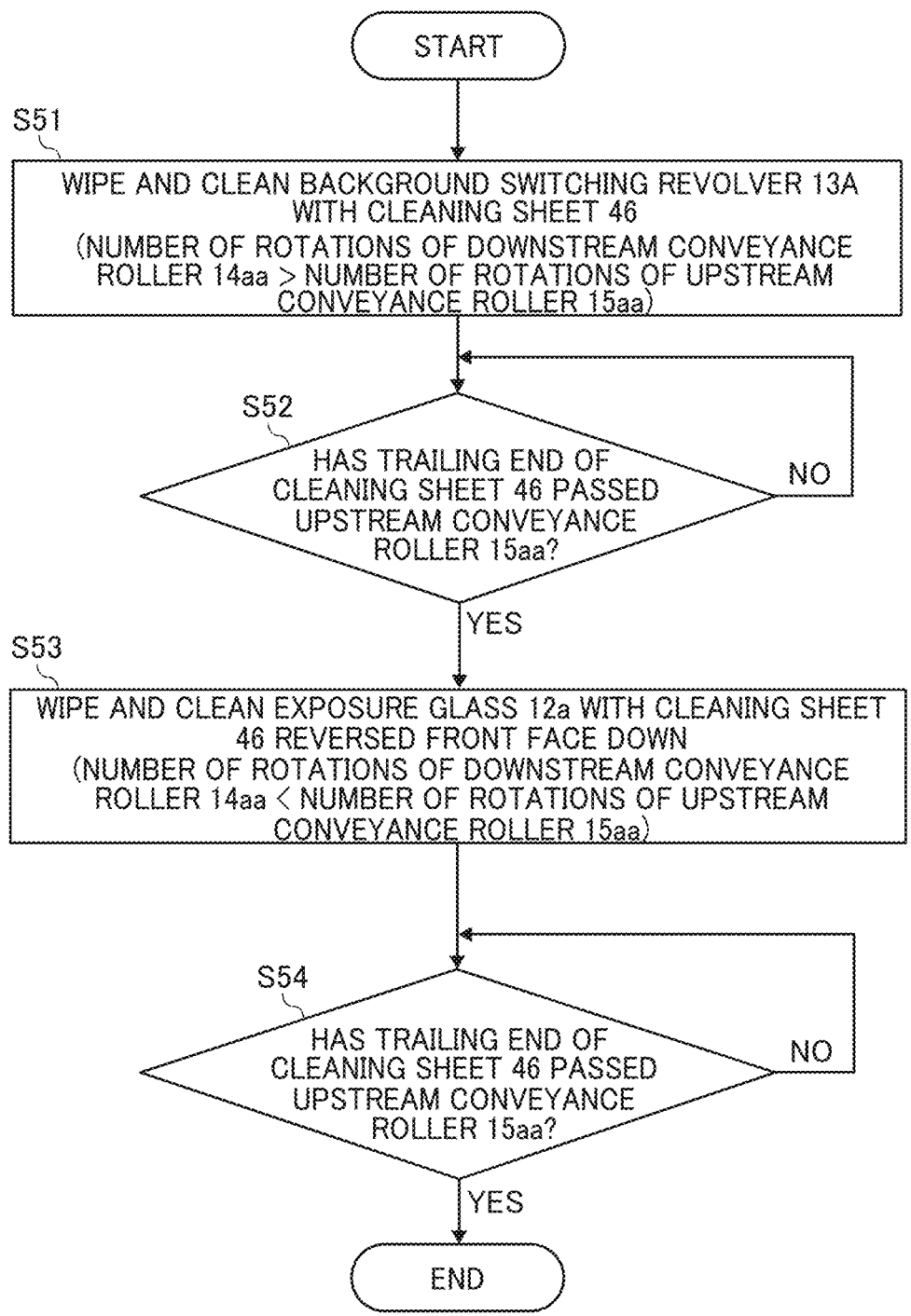
FIG. 22 is a flowchart of a control flow in a cleaning operation performed on a downstream reading unit according to the ninth embodiment.

Next, a description is given of cleaning operations with respect to the downstream reading device according to the present embodiment, with reference to a flowchart in FIG. 22.

FIG. 22 is a flowchart of a control flow in a cleaning operation performed on a downstream reading unit according to the ninth embodiment of the present disclosure.

First, the cleaning sheet 46 that has passed the image reading device 1B disposed upstream in the image reader 130 in the conveyance direction of the cleaning sheet 46 or another cleaning sheet 46 that is newly conveyed from the sheet feed tray 121B is conveyed to wipe and clean the circumferential surface of the background switching revolver 13A of the image reading device 1A disposed downstream in the image reader 130 in the conveyance direction of the cleaning sheet 46 in FIG. 20 (S51). At this time, the controller 150 controls so that the number of rotations of the downstream conveyance roller 14aa is greater than the number of rotations of the upstream conveyance roller 15aa. In other words, the controller 150 controls to satisfy the following relation: the number of rotations of the downstream conveyance roller 14aa>the number of rotations of the upstream conveyance roller 15aa.

Thereafter, the controller 150 determines whether the trailing end of the cleaning sheet 46 has passed the downstream conveyance roller 15aa (S52).

When the trailing end of the cleaning sheet 46 has not passed the downstream conveyance roller 15aa (NO in S52), step S52 is repeated until the trailing end of the cleaning sheet 46 passes the downstream conveyance roller 15aa. When the trailing end of the cleaning sheet 46 has passed the downstream conveyance roller 15aa (YES in S52), the cleaning sheet 46 is conveyed to the image reading device 1A disposed downstream in the image reader 130 in the conveyance direction of the cleaning sheet 46 and is reversed with the first face down, so that the cleaning sheet 46 wipes and cleans the exposure glass 12a (S53). At this time, the controller 150 controls so that the number of rotations of the downstream conveyance roller 14aa is smaller than the number of rotations of the upstream conveyance roller 15aa. In other words, the controller 150 controls to satisfy the following relation: the number of rotations of the downstream conveyance roller 14aa<the number of rotations of the upstream conveyance roller 15aa.

Thereafter, the controller 150 determines whether the trailing end of the cleaning sheet 46 has passed the downstream conveyance roller 15aa (S54). When the trailing end of the cleaning sheet 46 has not passed the downstream conveyance roller 15aa (NO in S54), step S54 is repeated until the trailing end of the cleaning sheet 46 passes the downstream conveyance roller 15aa. When the trailing end of the cleaning sheet 46 has passed the downstream conveyance roller 15aa (YES in S54), the process ends.

Figure 23:
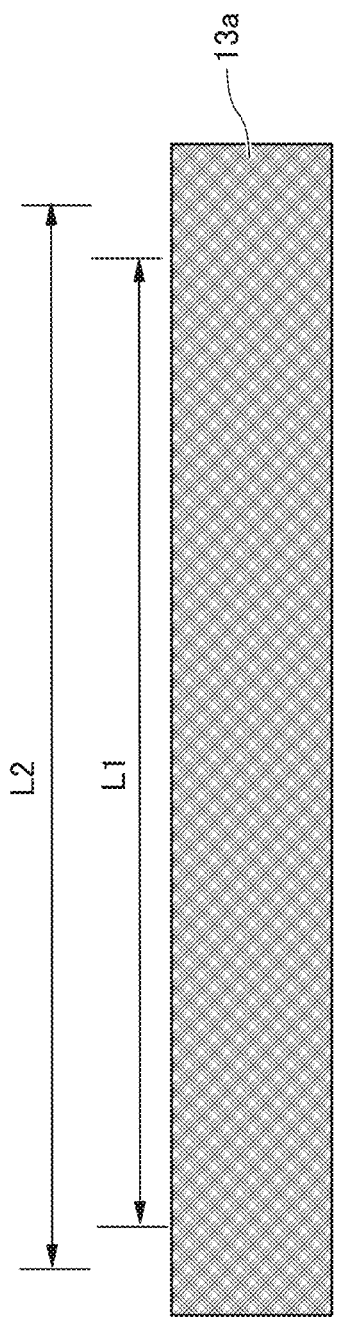
FIG. 23 is a diagram illustrating a black background roller of a background switching revolver according to a tenth embodiment of the present disclosure, for explaining a relation of the black background roller and each of the width of a sheet and the width of a cleaning sheet.

Next, a description is given of a black background roller of a background switching revolver according to a tenth embodiment of the present disclosure, with reference to FIG. 23.

FIG. 23 is a diagram illustrating a black background roller of a background switching revolver according to the tenth embodiment of the present disclosure, for explaining a relation of the black background roller and each of the width of a sheet and the width of a cleaning sheet.

In the present embodiment, cleaning is performed with a cleaning sheet that has a width wider than the width of a sheet S to be read by the image reading device 1. In other words, cleaning is performed with a cleaning sheet that has a width wider than the width of the sheet S in a direction orthogonal to the conveyance direction of the sheet S.

When reading a white sheet S, the background roller of the background switching revolver 13 is switched to the black background roller 13a. By so doing, the reading unit 11 reads the end boundary of the white sheet S.

A width L2 of the cleaning sheet 46 is preferably greater than the maximum width L1 of sheet S to be conveyed. As a result, the cleaning sheet 46 wipes and cleans dirt on the black background roller 13a near the maximum width of sheet S. Due to this configuration, degradation in reading of the end boundary of the sheet S having the maximum width is restrained.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image reading device comprising:
   a reader configured to read a sheet;
   a transparent member between the reader and the sheet facing the reader;
   an opposing member facing the reader via the transparent member, the opposing member not being in contact with the transparent member;
   a first conveyance rotator upstream from the reader in a conveyance direction of the sheet;
   a second conveyance rotator downstream from the reader in the conveyance direction; and
   circuitry configured to:
      cause the first conveyance rotator and the second conveyance rotator to convey a cleaning sheet at respective conveying speeds different from each other; and
      bring the cleaning sheet into contact with at least one of the transparent member or the opposing member,
   wherein the transparent member is configured to contact a first face of the cleaning sheet and the opposing member is configured to contact a second face, different from the first face, of the cleaning sheet when the cleaning sheet is conveyed to a position facing the at least one of the transparent member or the opposing member.

2. The image reading device according to claim 1, further comprising:
   a first sheet stacker configured to stack the sheet on which an image is formed; and
   a second sheet stacker configured to stack the cleaning sheet.

3. The image reading device according to claim 1, further comprising:
   a first sheet feeder configured to feed the sheet on which an image is to be formed; and
   a second sheet feeder configured to feed the cleaning sheet.

4. The image reading device according to claim 1, further comprising:
   a brush on at least one face of the cleaning sheet,
   wherein at least one of the transparent member or the opposing member is configured to contact the brush when the cleaning sheet is conveyed to a position facing the at least one of the transparent member or the opposing member.

5. The image reading device according to claim 1, further comprising:
   a first brush on the first face of the cleaning sheet; and
   a second brush on the second face of the cleaning sheet, and
   wherein the transparent member and the opposing member are configured to contact the first brush on the first face and the second brush on the second face, respectively, of the cleaning sheet when the cleaning sheet is conveyed to a position facing the at least one of the transparent member or the opposing member.

6. The image reading device according to claim 5,
   wherein the first brush on the first face of the cleaning sheet is at a position different from the second brush on the second face of the cleaning sheet in the conveyance direction of the cleaning sheet.

7. The image reading device according to claim 1,
   wherein a sheet used for image formation serves as the cleaning sheet, and
   wherein at least one of the transparent member or the opposing member is configured to contact the sheet used for image formation.

8. The image reading device according to claim 1,
   wherein the opposing member has a black surface and a white surface.

9. An image forming apparatus comprising:
   an image forming device configured to form an image on a sheet; and
   the image reading device according to claim 1 configured to read the image on the sheet.

10. An image forming apparatus comprising:
    the image reading device according to claim 1; and
    a fixing unit,
    wherein the image reading device is downstream from the fixing unit.

* * * * *